(12) United States Patent
Fukaya

(10) Patent No.: US 11,262,530 B2
(45) Date of Patent: Mar. 1, 2022

(54) IMAGING LENS COMPOSED OF FIVE OPTICAL ELEMENTS

(71) Applicant: TOKYO VISIONARY OPTICS CO., LTD., Tokyo (JP)

(72) Inventor: Hisao Fukaya, Sukagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 69 days.

(21) Appl. No.: 16/700,956

(22) Filed: Dec. 2, 2019

(65) Prior Publication Data

US 2020/0103617 A1 Apr. 2, 2020

Related U.S. Application Data

(63) Continuation of application No. 15/944,113, filed on Apr. 3, 2018, now abandoned.

(30) Foreign Application Priority Data

Apr. 3, 2017 (JP) .............................. JP2017-073758

(51) Int. Cl.
| | | |
|---|---|---|
| G02B 9/60 | (2006.01) | |
| G02B 13/18 | (2006.01) | |
| G02B 27/00 | (2006.01) | |
| G02B 27/64 | (2006.01) | |
| G02B 13/02 | (2006.01) | |
| G02B 7/02 | (2021.01) | |
| G02B 13/00 | (2006.01) | |

(52) U.S. Cl.
CPC ................. *G02B 9/60* (2013.01); *G02B 7/02* (2013.01); *G02B 13/0045* (2013.01); *G02B 13/02* (2013.01); *G02B 27/0025* (2013.01); *G02B 27/646* (2013.01)

(58) Field of Classification Search
CPC .............................. G02B 9/60; G02B 13/0045
USPC .................................. 359/714, 753, 763, 764
See application file for complete search history.

(56) References Cited

U.S. PATENT DOCUMENTS

| | | | |
|---|---|---|---|
| 2,803,996 | A | 8/1957 | Bouwers |
| 8,395,851 | B2 | 3/2013 | Tang et al. |
| 2012/0019706 | A1 | 1/2012 | Yamashita et al. |
| 2015/0277084 | A1 | 10/2015 | Hashimoto |
| 2015/0338608 | A1 | 11/2015 | Takei |

(Continued)

FOREIGN PATENT DOCUMENTS

| | | |
|---|---|---|
| JP | 2010-271541 A | 12/2010 |
| JP | 2013182132 A | 9/2013 |

*Primary Examiner* — William Choi
(74) *Attorney, Agent, or Firm* — Hamre, Schumann, Mueller & Larson, P.C.

(57) ABSTRACT

An imaging lens comprises five optical elements, in order from an object side to an image side, comprising, a first lens as a first optical element having positive refractive power, a second lens as a second optical element having negative refractive power and a convex surface facing the object side near an optical axis, a third lens as a third optical element having the refractive power, and a fourth lens as a fourth optical element having refractive power and the convex surface facing the object surface near the optical axis, wherein and an aberration correction optical element as a fifth optical element are arranged between said third lens and said fourth lens, said aberration correction optical element has both flat surfaces near the optical axis and aspheric surfaces.

15 Claims, 20 Drawing Sheets

(56) References Cited

U.S. PATENT DOCUMENTS

2016/0161720 A1 6/2016 Son
2017/0293116 A1 10/2017 Matsumoto

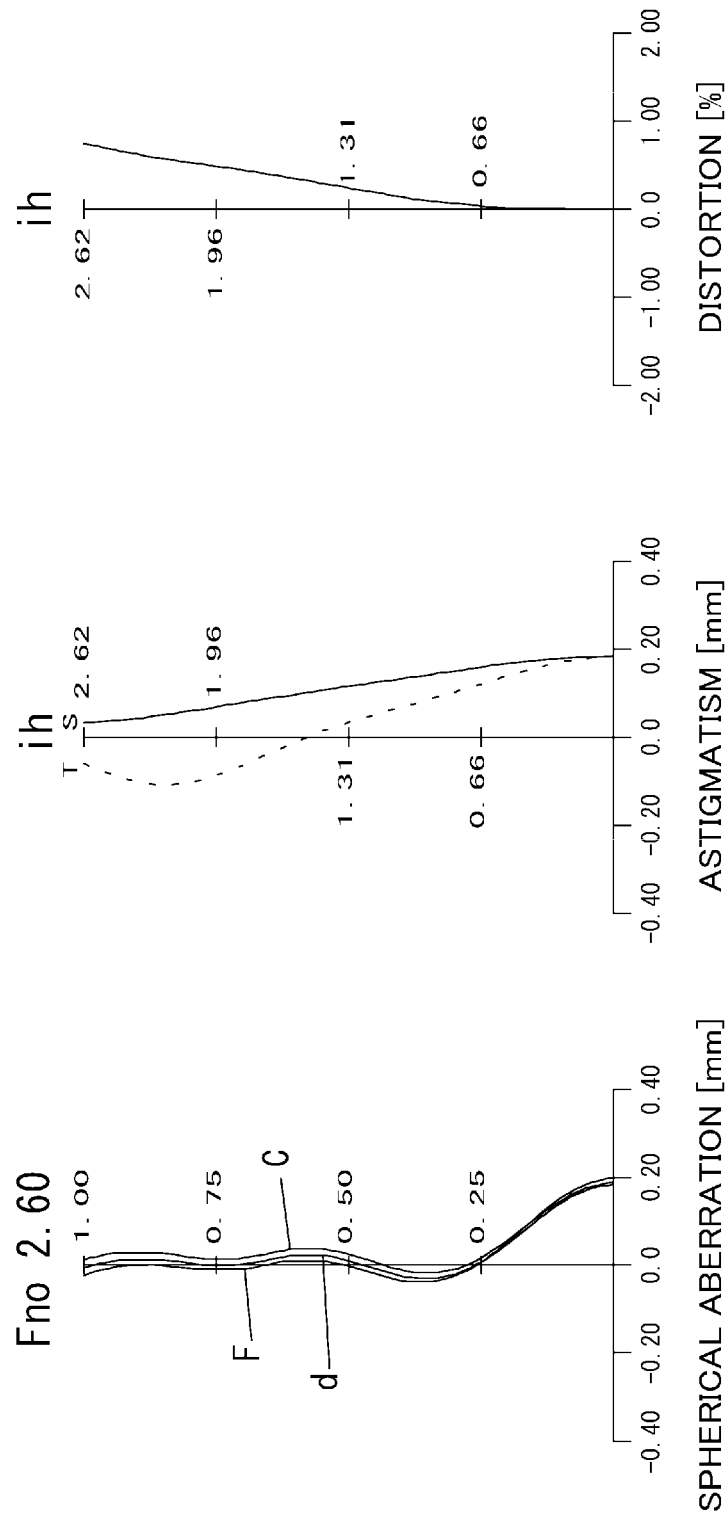

IMAGING LENS COMPOSED OF FIVE OPTICAL ELEMENTS

The present application is based on and claims priority of Japanese patent applications No. 2017-073758 filed on Apr. 3, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact imaging device, and more particularly to an imaging lens which is built in an imaging device mounted in an increasingly compact and low-profile smartphone and mobile phone, an information terminal such as a PDA (Personal Digital Assistant), a game console, PC and a robot, moreover, a home appliance and an automobile with the camera function.

Description of the Related Art

In recent years, it becomes common that camera function is mounted in much information equipment. Furthermore, it becomes indispensable as an additional value of products to mount a camera in the mobile phone and the smartphone, and the terminal equipment such as the PDA. Not only the mobile terminal equipment, but demand of products with the camera function such as a wearable appliance, the game console, the PC, the home appliance and a drone is more increased, and development of products will be rapidly made accordingly.

Corresponding to being compact and increasing in the number of pixels, the imaging lens is also required to have high performance in resolution and image quality, and therefore spread thereof and reduction in cost are also requested.

In order to meet demand of high performance, the imaging lens composed of a plurality of lenses becomes popular. There is also proposed the imaging lens composed of five lenses which enables high performance in comparison with the imaging lens composed of three or four lenses.

As a conventional imaging lens aiming the high performance, for example, imaging lenses disclosed in the following Patent Documents 1 and 2 are known.

Patent Document 1 (JP2010-271541A) discloses an imaging lens comprising in order from an object side, a first lens being a biconvex lens and having positive refractive power and, a second lens having negative refractive power and a concave surface facing an image side, a third lens as a meniscus lens having positive refractive power and a convex surface facing the image side, and a fourth lens as a double-sided aspheric lens having negative refractive power and a concave surface facing the image side.

Patent Document 2 (U.S. Pat. No. 8,395,851) discloses an imaging lens comprising in order from an object side, a first lens having positive refractive power, an aperture stop, a second lens having negative refractive power, a third lens having convex surfaces facing the object side and an image side, a fourth lens having a meniscus shape having a concave surface facing the object side, and a fifth lens having a concave surface facing the image side. Thus configured, the imaging lens aims high performance.

SUMMARY OF THE INVENTION

The imaging lens disclosed in the above Patent Document 1 aims the high performance using a small number of lenses, such as four, however four lenses is not enough for aberration correction. Therefore, it is difficult to respond to the demand of high pixel in recent year.

The imaging lens disclosed in the above Patent Document 2 is a lens system which is composed of five lenses, has a large diameter and is compact and is in high performance, and is configured to largely reduce manufacturing cost. This lens system certainly achieves brightness of F2.6. The lens configuration of the Patent Document 2, however, has a problem that a ratio of total track length to focal length of an overall optical system becomes too large.

SUMMARY OF THE INVENTION

The present invention has been made in view of the above problems, and an object of the present invention is to provide an imaging lens which telephoto ratio, a ratio of the total track length to focal length of an overall optical system applicable to the above mobile terminal equipment and information equipment is reduced, and which properly corrects aberrations and has high resolution.

In the present invention, classification of lens in optical elements is made if the optical element has refractive power near an optical axis. The optical element having the refractive power near an optical axis is called as the lens. The optical element having no refractive power near an optical axis does not change the focal length of an overall optical system, and contributes to improvement of aberrations in a peripheral area by effect of aspheric surfaces. This is called an aberration correction optical element. Regarding terms used in the present invention, a convex surface, a concave surface or a flat surface of a shape of the lens surface implies a shape near the optical axis (paraxial portion). Positive or negative of the refractive power also implies the refractive power near the optical axis (paraxial portion). The pole point made on the aspheric surface implies an off-axial point on an aspheric surface at which a tangential plane intersects the optical axis perpendicularly. The total track length is defined as a distance along the optical axis from an object-side surface of an optical element arranged closest to the object side to the image plane. When measurement of total track length is made, thickness of an IR cut filter or a cover glass which may be arranged between the optical element arranged closest to the image side and the image sensor is regarded as an air.

An imaging lens according to the present invention which forms an image of an object on a solid-state image sensor, comprises five optical elements, namely, in order from an object side to an image side, a first lens as a first optical element having positive refractive power, a second lens as a second optical element having negative refractive power and a convex surface facing the object side near an optical axis, a third lens as a third optical element having the refractive power, and a fourth lens as a fourth optical element having refractive power and the convex surface facing the object surface near the optical axis, and an aberration correction optical element as a fifth optical element having flat and aspheric surfaces facing both sides near the optical axis is arranged between the third lens and the fourth lens.

The imaging lens according to the above configuration achieves low-profileness by strengthening the refractive power of the first lens, and properly corrects spherical aberration and chromatic aberration by the second lens. The third lens maintains the low-profileness and corrects coma aberration and field curvature. The fourth lens suitably corrects the field curvature by the convex surface facing the object side near the optical axis. The aberration correction optical element as the fifth optical element properly corrects aberrations in a peripheral area of an image by the aspherical shape formed on both sides.

According to the imaging lens comprising the above five optical elements, it is preferable that a below conditional expression (1) is satisfied:

$$0.55 < TTL/f < 1.00 \tag{1}$$

where f: focal length of the overall optical system, and

TTL: distance along an optical axis from an object-side surface of the first lens to an image plane.

The conditional expression (1) defines a distance along the optical axis from the object-side surface of the first lens to an image plane to the focal length of the overall optical system of the imaging lens, and is a condition for shortening total track length. When a value is below the upper limit of the conditional expression (1), the total track length can be shortened and achieving compact size is facilitated. On the other hand, when the value is above the lower limit, correction of field curvature and axial chromatic aberration is facilitated and proper optical performance can be maintained.

According to the imaging lens comprising the above five optical elements, it is preferable that a below conditional expression (2) is satisfied:

$$2.00 < (d3/TTL) \times 100 < 12.65 \tag{2}$$

where

TTL: distance along an optical axis from an object-side surface of the first lens to an image plane, and d3: thickness on the optical axis of the third lens.

The conditional expression (2) defines an appropriate scope of thickness on the optical axis of the third lens, and is a condition for properly keeping formability of the third lens and maintaining the low-profileness. When a value is below the upper limit of the conditional expression (2), the thickness on the optical axis of the third lens is prevented from being excessively large, and securing air space on the object side and the image side of the third lens is facilitated. As a result, low-profileness can be maintained. On the other hand, when the value is above the lower limit of the conditional expression (2), the thickness on the optical axis of the third lens is prevented from being excessively small, formability of the lens can be properly kept.

According to the imaging lens comprising the above five optical elements, it is preferable that a below conditional expression (3) is satisfied:

$$2.00 < (d4/TTL) \times 100 < 7.10 \tag{3}$$

where

TTL: distance along an optical axis from an object-side surface of the first lens to an image plane, and d4: thickness on the optical axis of the fourth lens.

The conditional expression (3) defines an appropriate scope of thickness on the optical axis of the fourth lens, and is a condition for properly keeping formability of the fourth lens and maintaining the low-profileness. When a value is below the upper limit of the conditional expression (3), the thickness on the optical axis of the fourth lens is prevented from being excessively large, and securing air space on the object side and the image side of the fourth lens is facilitated. As a result, low-profileness can be maintained. On the other hand, when the value is above the lower limit of the conditional expression (3), the thickness on the optical axis of the fourth lens is prevented from being excessively small, and formability of the lens can be properly kept.

According to the imaging lens comprising the above five optical elements, it is preferable that aspheric surfaces on both sides of the aberration correction optical element varies its object side and image side in a direction toward the object side as a distance from the axis increases. By forming such aspheric surfaces, an angle of light ray emitted from the aberration correction optical element is controlled and aberration of marginal ray can be suppressed. As a result, aberration correction in the peripheral area is facilitated.

According to the imaging lens comprising the above five optical elements, it is preferable that the aspheric surface having at least one pole point at an off-axial position is formed on the image-side surface of the fourth lens.

By forming the aspheric surface having the pole point on the image-side surface of the fourth lens, field curvature and distortion can be properly corrected, and chief ray angle to the image sensor can be properly controlled.

According to the imaging lens comprising the above five optical elements, it is preferable that a below conditional expression (4) is satisfied:

$$0.07 < TN/f < 0.30 \tag{4}$$

where f: focal length of the overall optical system, and

TN: distance along an optical axis of an air space for arranging the aberration correction optical element.

The conditional expression (4) defines an appropriate arrangement space of the aberration correction optical element, and is a condition for maintaining the low-profileness and properly correcting the aberrations at the in the peripheral area. When a value is below the upper limit of the conditional expression (4), the low-profileness can be maintained and the arrangement space of the aberration correction optical element can be secured. On the other hand, when the value is above the lower limit of the conditional expression (4), the arrangement space of the aberration correction optical element can be prevented from being excessively small. Accordingly, flexibility in a shape of the aspheric surface on the both sides is increased and an effect of the aberration correction by the optical element is also enhanced.

According to the imaging lens comprising the above five optical elements, it is preferable that a below conditional expression (5) is satisfied:

$$2.4 < (TNT/TTL) \times 100 < 10.8 \tag{5}$$

where

TTL: distance along an optical axis from an object-side surface of the first lens to an image plane, and TNT: thickness on the optical axis of the aberration correction optical element.

The conditional expression (5) defines an appropriate scope of thickness on the optical axis of the aberration correction optical element, and is a condition for properly keeping formability of the aberration correction optical element and maintaining the low-profileness. When a value is below the upper limit of the conditional expression (5), the thickness on the optical axis of the aberration correction optical element is prevented from being excessively large, and securing air space on the object side and the image side of the aberration correction optical element is facilitated. As a result, low-profileness can be maintained. On the other hand, when the value is above the lower limit of the conditional expression (5), the thickness on the optical axis of the aberration correction optical element is prevented from being excessively small, and formability of the lens can be properly kept.

According to the imaging lens comprising the above five optical elements, it is preferable that a below conditional expression (6) is satisfied:

$$2.00<(d2/TTL)\times100<6.5 \qquad (6)$$

where
TTL: distance along an optical axis from an object-side surface of the first lens to an image plane, and
d2: thickness on the optical axis of the second lens.

The conditional expression (6) defines an appropriate scope of thickness on the optical axis of the second lens, and is a condition for properly keeping formability of the second lens and maintaining the low-profileness. When a value is below the upper limit of the conditional expression (6), the thickness on the optical axis of the second lens is prevented from being excessively large, and securing air space on the object side and the image side of the second lens is facilitated. As a result, low-profileness can be maintained. On the other hand, when the value is above the lower limit of the conditional expression (6), the thickness on the optical axis of the second lens is prevented from being excessively small, and formability of the lens can be properly kept.

According to the imaging lens comprising the above five optical elements, it is preferable that a below conditional expression (7) is satisfied:

$$0.30<f1/1<1.1 \qquad (7)$$

where
f: focal length of the overall optical system, and
f1: focal length of the first lens.

The conditional expression (7) defines refractive power of the first lens, and is a condition for achieving the low-profileness and the proper aberration correction. When a value is below the upper limit of the conditional expression (7), positive refractive power of the first lens becomes appropriate, and low-profileness is facilitated. On the other hand, when the value is above the lower limit of the conditional expression (7), high-order spherical aberration and the coma aberration can be suppressed to be small.

According to the imaging lens comprising the above five optical elements, it is preferable that a below conditional expression (8) is satisfied:

$$-0.01<r1/r2<0.6 \qquad (8)$$

where
r1: curvature radius of the object-side surface of the first lens, and
r2: curvature radius of the image-side surface of the first lens.

The conditional expression (8) defines relationship of the curvature radii of the object-side surface and the image-side surface of the first lens, and is a condition for suppressing occurrence of the spherical aberration. When a value is below the upper limit of the conditional expression (8), the positive refractive power of the first lens is maintained and the low-profileness is facilitated. On the other hand, when the value is above the lower limit of the conditional expression (8), the positive refractive power of the object-side surface of the first lens is prevented from being excessively large, and occurrence of the spherical aberration is suppressed. Additionally, sensitivity to manufacturing error is reduced.

According to the imaging lens comprising the above five optical elements, it is preferable that a below conditional expression (9) is satisfied:

$$-1.6<f2/f<-0.6 \qquad (9)$$

where
f: focal length of the overall optical system, and
f2: focal length of the second lens.

The conditional expression (9) defines the refractive power of the second lens, and is a condition for achieving the low-profileness and the proper aberration correction. When a value is below the upper limit of the conditional expression (9), negative refractive power of the second lens becomes appropriate, and low-profileness is facilitated. On the other hand, when the value is above the lower limit of the conditional expression (9), correction of the spherical aberration and the chromatic aberration occurred at the first lens is facilitated.

According to the imaging lens comprising the above five optical elements, it is preferable that a below conditional expression (10) is satisfied:

$$1.5<r3/r4<5.0 \qquad (10)$$

where
r3: curvature radius of the object-side surface of the second lens, and
r4: curvature radius of the image-side surface of the second lens.

The conditional expression (10) defines relationship of the curvature radii of the object-side surface and the image-side surface of the second lens, and is a condition for suppressing occurrence of the astigmatism. By satisfying the conditional expression (10), the second lens becomes a meniscus lens near the optical axis, and the astigmatism can be properly corrected.

According to the imaging lens comprising the above five optical elements, it is preferable that a below conditional expression (11) is satisfied:

$$0.5<|f3|/f<3.4 \qquad (11)$$

where
f: focal length of the overall optical system, and
f3: focal length of the third lens.

The conditional expression (11) defines the refractive power of the third lens, and is a condition for achieving the proper aberration correction. By satisfying the conditional expression (11), positive or negative refractive power of the third lens becomes appropriate, and it is facilitated to suppress the high-order spherical aberration and the coma aberration to be small.

According to the imaging lens comprising the above five optical elements, composite focal length of the second lens and the third lens is preferably negative, and it is further preferable that a below conditional expression (12) is satisfied:

$$-9.6<f23/f<-0.25 \qquad (12)$$

where
f: focal length of the overall optical system, and
f23: composite focal length of the second lens and the third lens.

The conditional expression (12) defines an appropriate scope of the composite focal length of the second lens and the third lens, and is a condition for the low-profileness and the proper aberration correction. When a value is below the upper limit of the conditional expression (12), negative composite refractive power of the second lens and the third lens becomes appropriate, and the low-profileness of the imaging lens is facilitated. On the other hand, when the value is above the lower limit of the conditional expression (12), correction of the field curvature and the chromatic aberration is facilitated.

According to the imaging lens comprising the above five optical elements, it is preferable that the fourth lens has a meniscus shape near the optical axis.

Thus the fourth lens has the meniscus shape near the optical axis, the more proper correction of the field curvature is enabled.

According to the imaging lens comprising the above five optical elements, it is preferable that a below conditional expression (13) is satisfied:

$$0.5 < r7/r8 < 2.10 \qquad (13)$$

where
r7: curvature radius of the object-side surface of the fourth lens, and
r8: curvature radius of the image-side surface of the fourth lens.

The conditional expression (13) defines relationship of the curvature radii of the object-side surface and the image-side surface of the fourth lens, and is a condition for properly correcting the spherical aberration, maintaining the low-profileness, and relaxing the sensitivity to manufacturing error. When a value is below the upper limit of the conditional expression (13), the refractive power of a concave surface of the image side of the fourth lens becomes appropriate, and the spherical aberration occurred at this surface is suppressed and the sensitivity to manufacturing error is reduced. On the other hand, when the value is above the lower limit of the conditional expression (13), positive or negative refractive power of the fourth lens becomes appropriate, the low-profileness is enabled.

According to the imaging lens comprising the above five optical elements, it is preferable that at least one surface of the first lens, the second lens, the third lens and the fourth lens, respectively is the aspheric surface. Using the aspheric surface enables the proper correction of the aberrations.

Effect of Invention

According to the present invention, there can be provided an imaging lens having small ratio of the total track length to the focal length of an overall optical system and the high resolution by reducing telephoto ratio.

BRIEF DESCRIPTION OF THE DRAWINGS

FIG. 20 shows spherical aberration, astigmatism, and distortion of the imaging lens in Example 10 according to the present invention.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9, 11, 13, 15, 17 and 19 are schematic views showing the general configurations of the imaging lenses in Examples 1 to 10 according to the embodiments of the present invention, respectively. Since all FIGS. 1, 3, 5, 7, 9, 11, 13, 15 and 17 have the same basic lens configuration, the general configuration of an imaging lens according to this embodiment is explained below mainly referring to the schematic view of Example 1.

Figure 1:
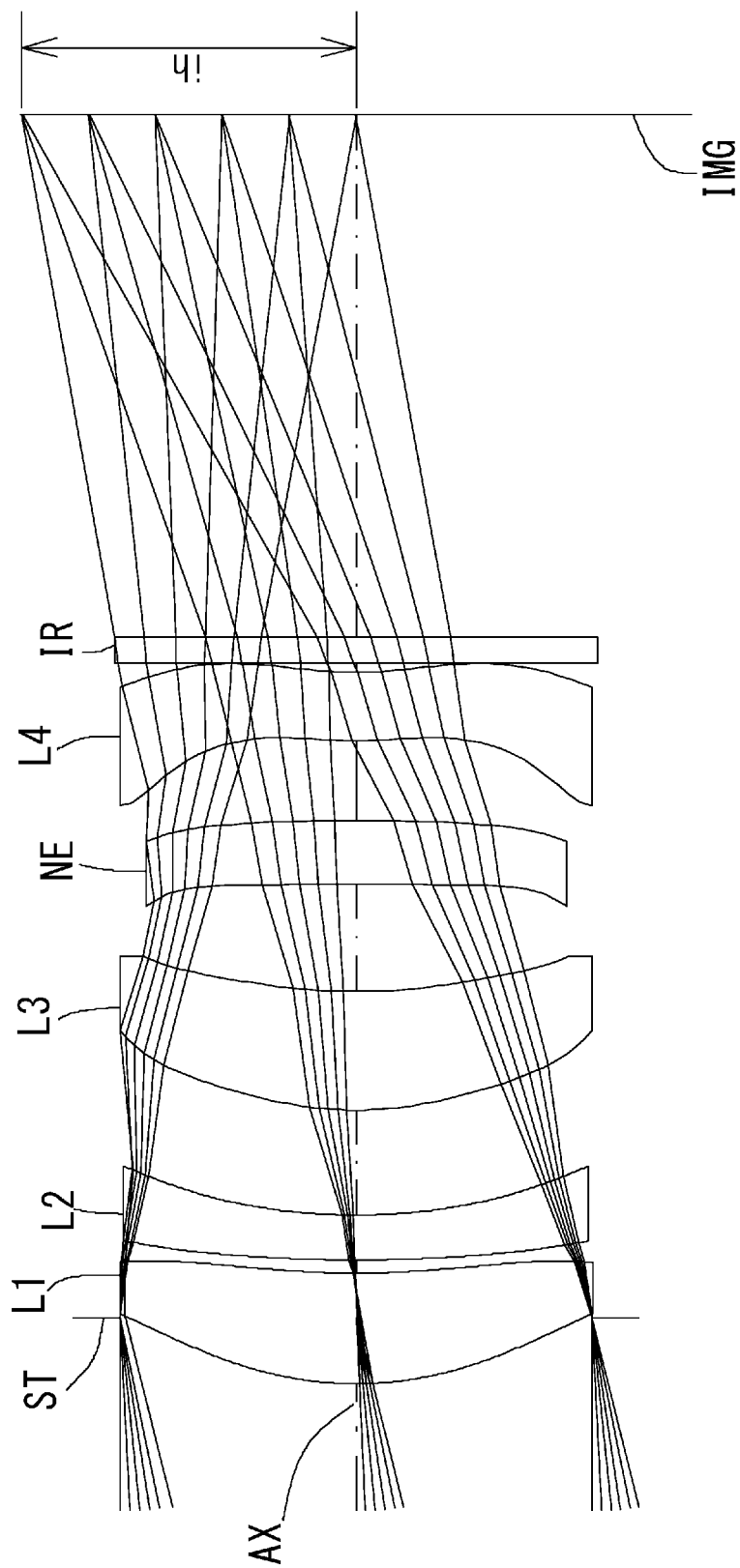
FIG. 1 is a schematic view showing a general configuration of an imaging lens in Example 1 according to the present invention.

FIG. 1 shows the configuration of the imaging lens according to the Example 1, and an optical axis (AX) is a center line of optical path of the light entering from an object side. As shown in FIG. 1, an imaging lens according to this embodiment comprises, in order from an object side to an image side, a first lens L1 as a first optical element having positive refractive power, a second lens L2 as a second optical element having negative refractive power and a convex surface facing the object side near an optical axis AX, a third lens L3 as a third optical element, and a fourth lens L4 as a fourth optical element having convex surface facing the object surface near the optical axis AX, and an aberration correction optical element NE as a fifth optical element having flat and aspheric surfaces near the optical axis AX is arranged between the third lens L3 and the fourth lens L4. Therefore, the imaging lens according to this embodiment is composed of five optical elements, four optical elements having the refractive power and one aberration correction optical element having no substantial refractive power.

The aberration correction optical element NE having no substantial refractive power which is arranged in the above embodiment has a shape of a parallel plate near the optical axis AX. Therefore, it has no influence upon the refractive power of an overall optical system of the imaging lens or upon the refractive power of the four lenses from the first lens L1 as the first optical element to the fourth lens L4 as the fourth optical element. So, aberrations only in a peripheral area are corrected without changing parameters such as the focal length of the overall optical system, thickness at a center of the lens, and so on.

A filter IR such as an IR cut filter and a cover glass is located between the fourth lens L4 and an image plane IMG (namely, the image plane of the imaging lens). The filter IR is omissible.

In each Example, there are many options such that the refractive power of the third lens L3 and the fourth lens L4 may be positive or negative, and an image-side surface of the first lens L1 and an object-side and image-side surfaces of the third lens L3 may be convex or concave near the optical axis AX. In each Example, the most suitable combination is selected for achieving desirable performance.

More specifically, refractive power arrangement in the Examples 1 to 3 is, in order from the object side, +−+−, the refractive power arrangement in the Examples 4, 6 and 7 is, in order from the object side, +−−+, and the refractive power arrangement in the Examples 5, 8 and 9 is, in order from the object side, +−−−. Features that the first lens L1 has the positive refractive power and the second lens L2 has the negative refractive power are common to all of Examples. Regarding the shape of the lens, the object-side surface of the first lens L1 is convex near the optical axis AX, the second lens is a meniscus lens having the convex object-side surface near the optical axis AX, and the fourth lens L4 is a meniscus lens having the convex object-side surface near the optical axis AX. These features are common to all of the Examples. Such combination of the refractive power and the shape of the surface is only one example, and various combinations may be selected according to a system to which the lenses are adopted without being contrary to an object of the present invention.

Figure 19:
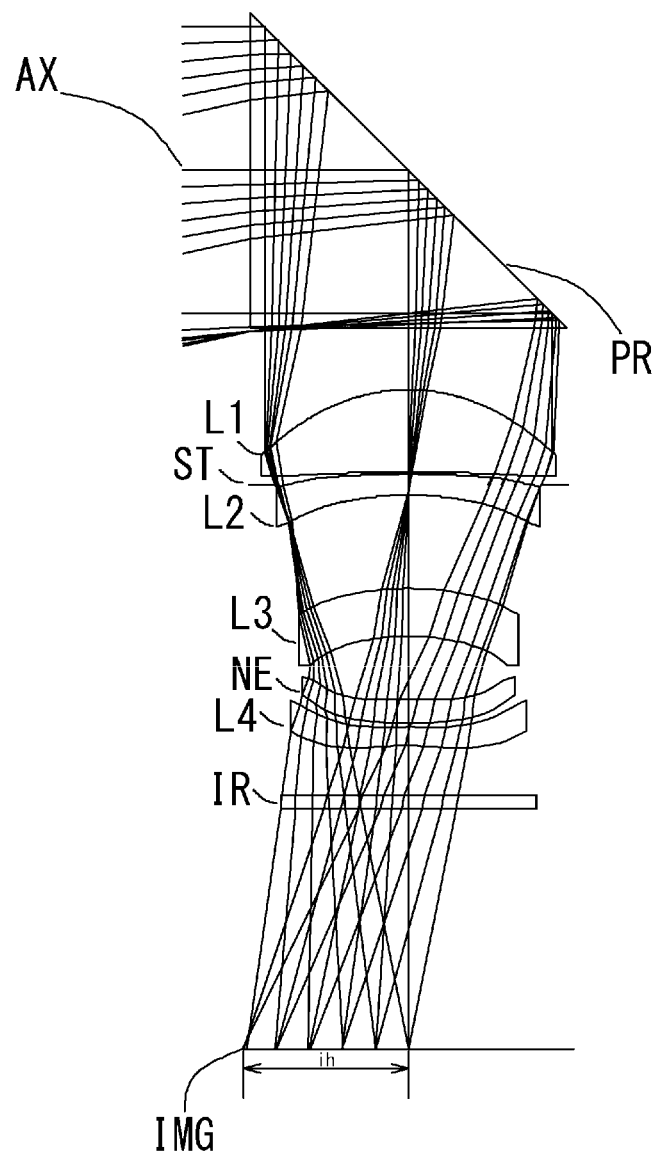
FIG. 19 is a schematic view showing the general configuration of an imaging lens in Example 10 according to the present invention.

An Example 10 as shown in FIG. 19 shows an embodiment in which a prism PR is added on the object side of the imaging lens comprising the five optical elements of the Example 8. An inclined surface of the prism PR functions as a refractive surface for bending an optical path at an approximately right angle. Since the imaging lens comprising the five optical elements according to the present invention is a telephoto type optical system having a telephoto ratio of less than 1.0, total track length is longer than that of an optical system of wide field of view type. If a folded optics to which the prism PR is added closest to the object side and the optical path is bend at the approximately right angle is used, as shown in FIG. 19, the imaging lens can be also mounted in a thin device by rotating arrangement of the imaging lens by 90°. If a material having a large refractive index is used for the prism PR, the prism PR itself becomes compact, and is easily adopted to the thin device. Furthermore, by using the flat surface for the refractive surface of the prism PR, occurrence of asymmetric distortion and field curvature can be suppressed. In place of the prism PR, a reflector can be used for the folded optics and configuration of the folded optics is flexible if the optical path is folded at an approximately right angle.

The imaging lens comprising the five optical elements according to the present embodiments facilitates manufacture by using plastic materials to all of the lenses, and realizes mass production in a low cost. Additionally, both surfaces of all of the lenses are made as proper aspheric surfaces, and the aberrations are favorably corrected.

The material applied to the lens is not limited to the plastic material. By using glass material, further high performance may be aimed. All of surfaces of lenses are preferably formed as aspheric surfaces, however, spherical surfaces may be adopted which is easy to manufacture in accordance with required performance.

The imaging lens according to the present embodiments shows preferable effect by satisfying the below conditional expressions (1) to (13).

$$0.55 < TTL/f < 1.00 \tag{1}$$

$$2.00 < (d3/TTL) \times 100 < 12.65 \tag{2}$$

$$2.00 < (d4/TTL) \times 100 < 7.10 \tag{3}$$

$$0.07 < TN/f < 0.30 \tag{4}$$

$$2.4 < (TNT/TTL) \times 100 < 10.8 \tag{5}$$

$$2.00 < (d2/TTL) \times 100 < 6.5 \tag{6}$$

$$0.30 < f1/1 < 1.1 \tag{7}$$

$$-0.01 < r1/r2 < 0.6 \tag{8}$$

$$-1.6 < f2/f < -0.6 \tag{9}$$

$$1.5 < r3/r4 < 5.0 \tag{10}$$

$$0.5 < |f3|/f < 3.4 \tag{11}$$

$$-9.6 < f23/f < -0.25 \tag{12}$$

$$0.5 < r7/r8 < 2.10 \tag{13}$$

where
f: focal length of the overall optical system,
TTL: distance along an optical axis AX from an object-side surface of the first lens L1 to an image plane IMG,
d2: thickness on the optical axis of the second lens L2,
d3: thickness on the optical axis of the third lens L3,
d4: thickness on the optical axis of the fourth lens L4,
TNT: thickness on the optical axis AX of the aberration correction optical element NE,
TN: distance along an optical axis AX of an air space for arranging the aberration correction optical element NE,
f1: focal length of the first lens L1,
f2: focal length of the second lens L2,
f3: focal length of the third lens L3,
f23: composite focal length of the second lens L2 and the third lens L3,
r1: curvature radius of the object-side surface of the first lens L1, r2: curvature radius of the image-side surface of the first lens L1,
r3: curvature radius of the object-side surface of the second lens L2,
r4: curvature radius of the image-side surface of the second lens L2,
r7: curvature radius of the object-side surface of the fourth lens L3, and
r8: curvature radius of the image-side surface of the fourth lens L3.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (13a).

$0.71 < TTL/f < 1.00$ (1a)

$2.51 < (d3/TTL) \times 100 < 11.16$ (2a)

$2.41 < (d4/TTL) \times 100 < 6.22$ (3a)

$0.09 < TN/f < 0.26$ (4a)

$2.97 < (TNT/TTL) \times 100 < 9.51$ (5a)

$2.53 < (d2/TTL) \times 100 < 5.67$ (6a)

$0.36 < f1/1 < 0.91$ (7a)

$-0.005 < r1/r2 < 0.477$ (8a)

$-1.35 < f2/f < -0.74$ (9a)

$1.87 < r3/r4 < 4.40$ (10a)

$0.61 < |f3|/f < 2.94$ (11a)

$-8.45 < f23/f < -0.36$ (12a)

$0.70 < r7/r8 < 1.81$ (13a)

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a curvature radius, k denotes a conic constant, and A4, A6, A8, A10, A12, A14, and A16 denote aspheric surface coefficients.

$$Z = \frac{\frac{H^2}{R}}{1 + \sqrt{1-(k+1)\frac{H^2}{R^2}}} + A_4H^4 + A_6H^6 + A_8H^8 + A_{10}H^{10} + A_{12}H^{12} + A_{14}H^{14} + A_{16}H^{16}$$

Equation 1

Next, examples of the imaging lens according to this embodiment will be explained. In each example, f denotes the focal length of the overall optical system of the imaging lens, Fno denotes an F-number, ω denotes a half field of view, and ih denotes a maximum image height. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Example 1 |
| --- |
| Unit mm |
| f = 10.35<br>Fno = 2.8<br>ω(°) = 14.2<br>ih = 2.62<br>TTL = 9.88 |

Surface Data

| Surface Number i | Curvature Radius r | Surface Distance d | Refractive Index Nd | Abbe Number vd |
| --- | --- | --- | --- | --- |
| (Object) | Infinity | Infinity | | |
| 1 (Stop) | Infinity | −0.5173 | | |
| 2* | 2.8030 | 0.8669 | 1.544 | 55.86 |
| 3* | 6.7578 | 0.1046 | | |
| 4* | 11.7546 | 0.3514 | 1.650 | 21.54 |
| 5* | 4.5076 | 0.8248 | | |
| 6* | 2.8696 | 0.9271 | 1.535 | 55.66 |
| 7* | 4.3031 | 0.8436 | | |
| 8* | Infinity | 0.4974 | 1.650 | 21.54 |
| 9* | Infinity | 0.6292 | | |
| 10* | 3.9553 | 0.5342 | 1.535 | 55.66 |
| 11* | 2.7041 | 0.5000 | | |
| 12 | Infinity | 0.2100 | 1.517 | 64.20 |
| 13 | Infinity | 3.6643 | | |
| Image Plane | Infinity | | | |

TABLE 1-continued

Example 1

Constituent Lens Data

| Lens | Start Surface | Focal Length | | Composite Focal Length |
|---|---|---|---|---|
| 1 | 2 | 8.168 | f12 | 20.175 |
| 2 | 4 | −11.461 | f23 | −76.047 |
| 3 | 6 | 13.145 | f34 | 24.251 |
| 4 | 10 | −18.777 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | −6.070000E+00 | 0.000000E+00 |
| A4 | −5.273323E−03 | −1.563722E−02 | −8.122403E−03 | 1.085686E−03 | −1.758940E−02 |
| A6 | −1.072083E−03 | 1.214402E−03 | 5.626665E−03 | 2.850243E−03 | −3.594036E−03 |
| A8 | −3.064622E−04 | −2.630533E−04 | −9.033017E−04 | 1.735028E−04 | 2.227164E−03 |
| A10 | 0.000000E+00 | −3.156556E−05 | 0.000000E+00 | −1.075789E−04 | −2.815564E−04 |
| A12 | 0.000000E+00 | 7.253542E−06 | 0.000000E+00 | −1.871580E−05 | 3.279344E−04 |
| A14 | 0.000000E+00 | 0.000000E+00 | 0.000000E+00 | 0.000000E+00 | −1.226767E−04 |
| A16 | 0.000000E+00 | 0.000000E+00 | 0.000000E+00 | 0.000000E+00 | 1.437481E−05 |

| | Seventh Surface | Eighth Surface | Ninth Surface | Tenth Surface | Eleventh Surface |
|---|---|---|---|---|---|
| k | 0.000000E+00 | 0.000000E+00 | 0.000000E+00 | 0.000000E+00 | −9.000000E+00 |
| A4 | −1.287138E−02 | −2.753038E−02 | −7.559557E−02 | −2.161895E−01 | −1.261448E−01 |
| A6 | −2.579278E−03 | 3.016120E−02 | 7.741048E−02 | 7.808294E−02 | 6.438565E−02 |
| A8 | −1.825874E−03 | −1.140848E−02 | −4.195589E−02 | −1.971080E−03 | −2.411793E−02 |
| A10 | 2.963604E−03 | −5.161968E−03 | 1.227744E−02 | −2.010638E−02 | 4.702607E−03 |
| A12 | −9.586110E−04 | 5.528321E−03 | −2.369911E−03 | 1.084291E−02 | −4.370171E−05 |
| A14 | 1.262241E−04 | −1.997011E−03 | 1.970815E−04 | −2.442818E−03 | −1.359987E−04 |
| A16 | 0.000000E+00 | 2.599796E−04 | 1.585783E−05 | 2.209336E−04 | 1.594514E−05 |

The imaging lens in Example 1 satisfies conditional expressions (1) to (13) as shown in Table 11.

Figure 2:
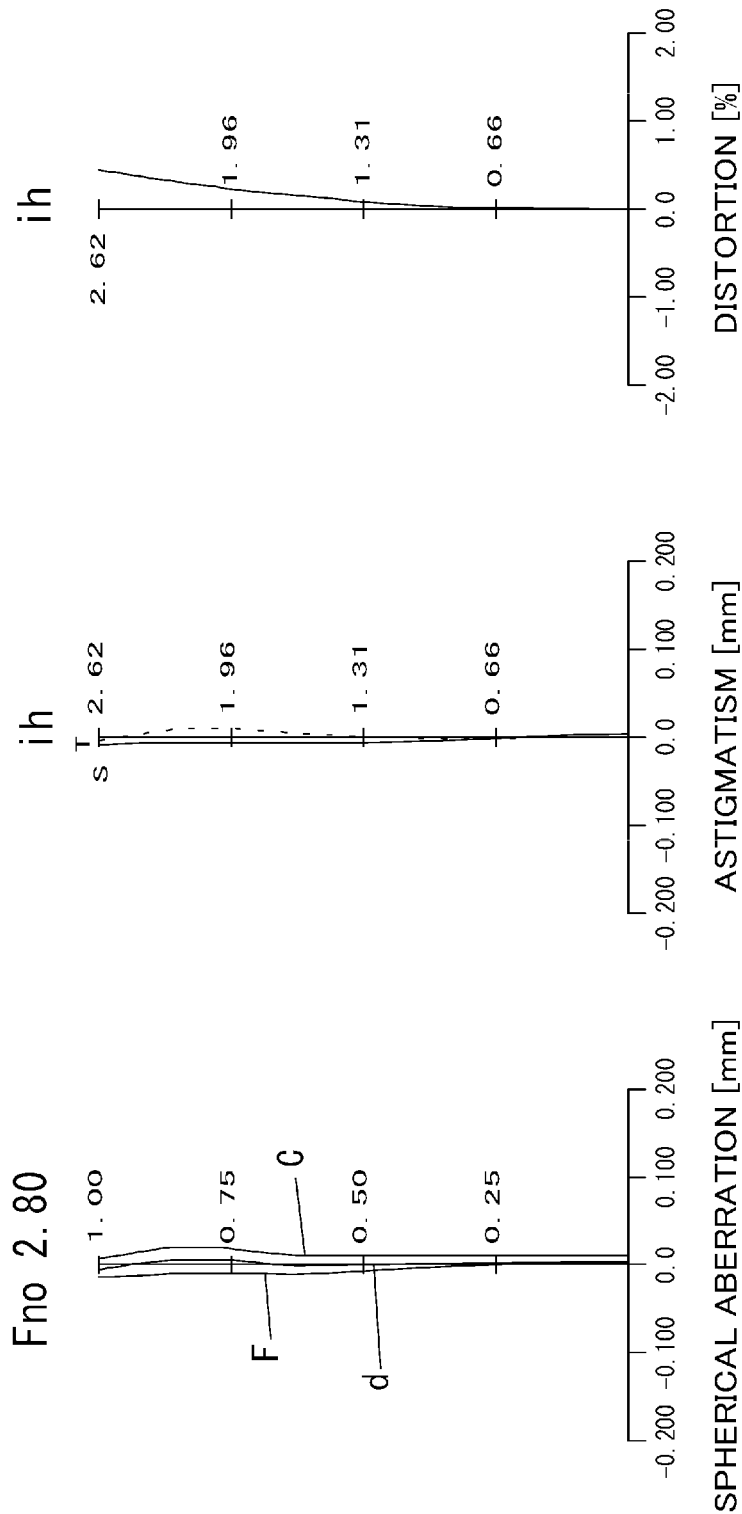
FIG. 2 shows spherical aberration, astigmatism, and distortion of the imaging lens in Example 1 according to the present invention.
Figure 3:
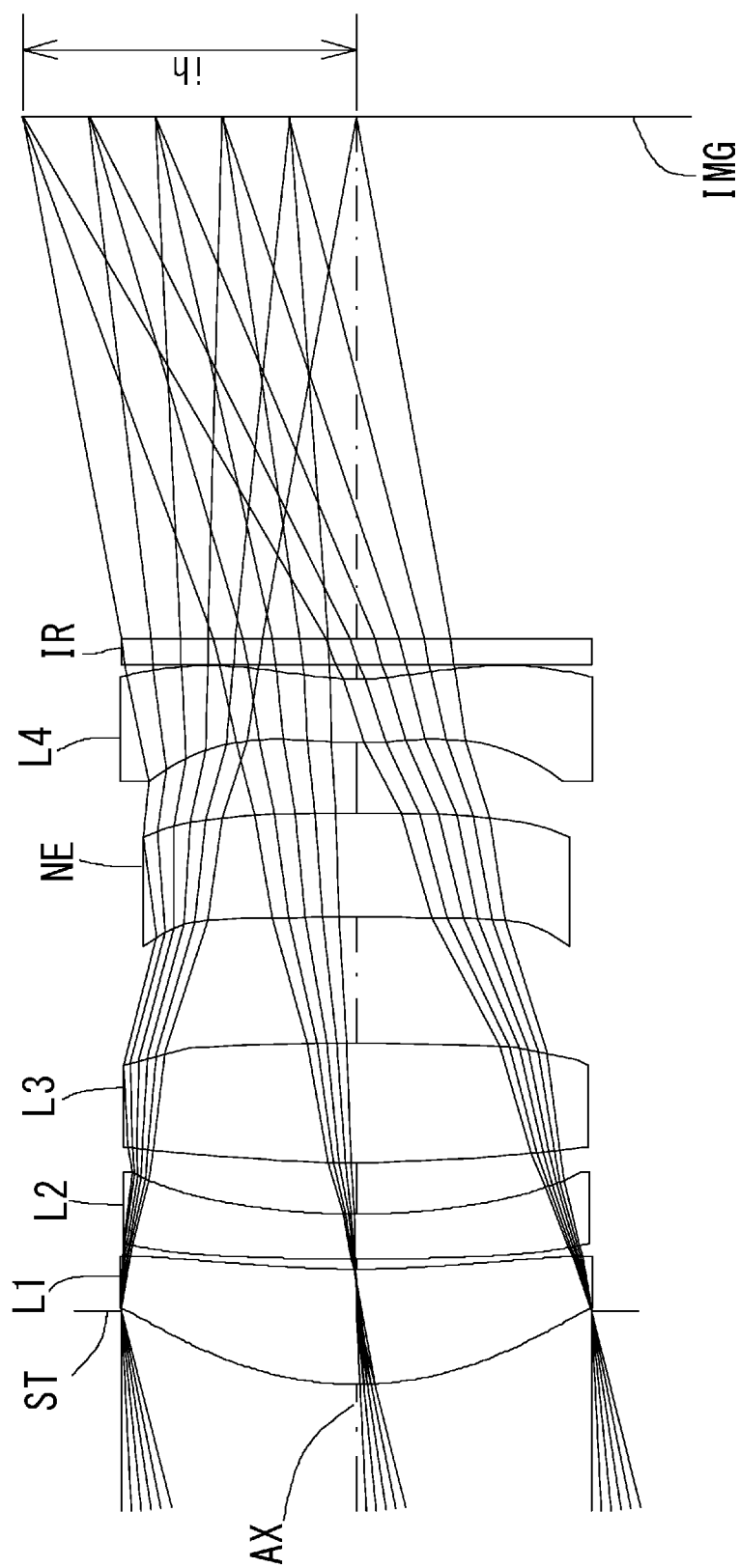
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S and on tangential image surface T, respectively (same as FIGS. 4, 6, 8, 10, 12, 14, 16, 18 and 20). As shown in FIG. 2, each aberration is corrected excellently.

Example 2

The basic lens data is shown below in Table 2.

TABLE 2

Example 2

Unit mm f = 10.36
Fno = 2.8
ω(°) = 14.0
ih = 2.62
TTL = 9.87

Surface Data

| Surface Number i | Curvature Radius r | Surface Distance d | Refractive Index Nd | Abbe Number vd |
|---|---|---|---|---|
| ( Object ) | Infinity | Infinity | | |
| 1 ( Stop ) | Infinity | −0.5767 | | |
| 2* | 2.7151 | 0.9046 | 1.544 | 55.86 |
| 3* | 8.0972 | 0.0800 | | |
| 4* | 21.2320 | 0.3519 | 1.650 | 21.54 |
| 5* | 5.6664 | 0.4035 | | |
| 6* | 8.7547 | 0.9331 | 1.535 | 55.66 |
| 7* | −250.0000 | 0.9944 | | |
| 8* | Infinity | 0.8161 | 1.650 | 21.54 |
| 9* | Infinity | 0.5567 | | |
| 10* | 3.6258 | 0.5000 | 1.535 | 55.66 |
| 11* | 2.3000 | 0.5000 | | |

TABLE 2-continued

| | | Example 2 | | |
|---|---|---|---|---|
| 12 | Infinity | 0.2100 | 1.517 | 64.20 |
| 13 | Infinity | 3.6952 | | |
| Image Plane | Infinity | | | |

Constituent Lens Data

| Lens | Start Surface | Focal Length | | Composite Focal Length |
|---|---|---|---|---|
| 1 | 2 | 7.085 | f12 | 13.900 |
| 2 | 4 | −11.992 | f23 | −54.281 |
| 3 | 6 | 15.836 | f34 | 157.173 |
| 4 | 10 | −13.541 | | |

Aspheric Surface Data

| | Second Surface | Third Surface | Fourth Surface | Fifth Surface | Sixth Surface |
|---|---|---|---|---|---|
| k | 0.000000E+00 | 0.000000E+00 | 0.000000E+00 | −6.100000E+00 | 0.000000E+00 |
| A4 | −3.449959E−03 | −1.296672E−02 | −7.811511E−03 | 2.136514E−04 | −1.133403E−02 |
| A6 | −4.656948E−04 | 1.892955E−03 | 5.955009E−03 | 2.895464E−03 | −5.169090E−03 |
| A8 | −4.701318E−04 | −1.969583E−04 | −7.384022E−04 | −9.041529E−05 | 6.881001E−03 |
| A10 | 0.000000E+00 | −2.815283E−05 | 0.000000E+00 | 6.102173E−06 | −3.954930E−03 |
| A12 | 0.000000E+00 | 1.425558E−06 | 0.000000E+00 | 2.836449E−06 | 1.606323E−03 |
| A14 | 0.000000E+00 | 0.000000E+00 | 0.000000E+00 | 0.000000E+00 | −3.585033E−04 |
| A16 | 0.000000E+00 | 0.000000E+00 | 0.000000E+00 | 0.000000E+00 | 3.083024E−05 |
| | Seventh Surface | Eighth Surface | Ninth Surface | Tenth Surface | Eleventh Surface |
| k | 0.000000E+00 | 0.000000E+00 | 0.000000E+00 | 0.000000E+00 | −9.000000E+00 |
| A4 | −1.048890E−02 | −2.306851E−02 | −7.064492E−02 | −2.295393E−01 | −1.072794E−01 |
| A6 | −5.220221E−05 | 1.675491E−02 | 6.574254E−02 | 9.685049E−02 | 4.596451E−02 |
| A8 | 1.615051E−03 | −4.776549E−03 | −3.929374E−02 | −1.251478E−02 | −1.607162E−03 |
| A10 | −1.016523E−03 | −4.059341E−03 | 1.921431E−02 | −8.287726E−03 | −1.044181E−02 |
| A12 | 1.243594E−04 | 3.372597E−03 | −9.097633E−03 | 1.175042E−03 | 5.411458E−03 |
| A14 | −1.001792E−08 | −1.454847E−03 | 2.589834E−03 | 1.148805E−03 | −1.127756E−03 |
| A16 | 0.000000E+00 | 2.421220E−04 | −2.866331E−04 | −2.672647E−04 | 8.677205E−05 |

The imaging lens in Example 2 satisfies conditional expressions (1) to (13) as shown in Table 11.

Figure 4:
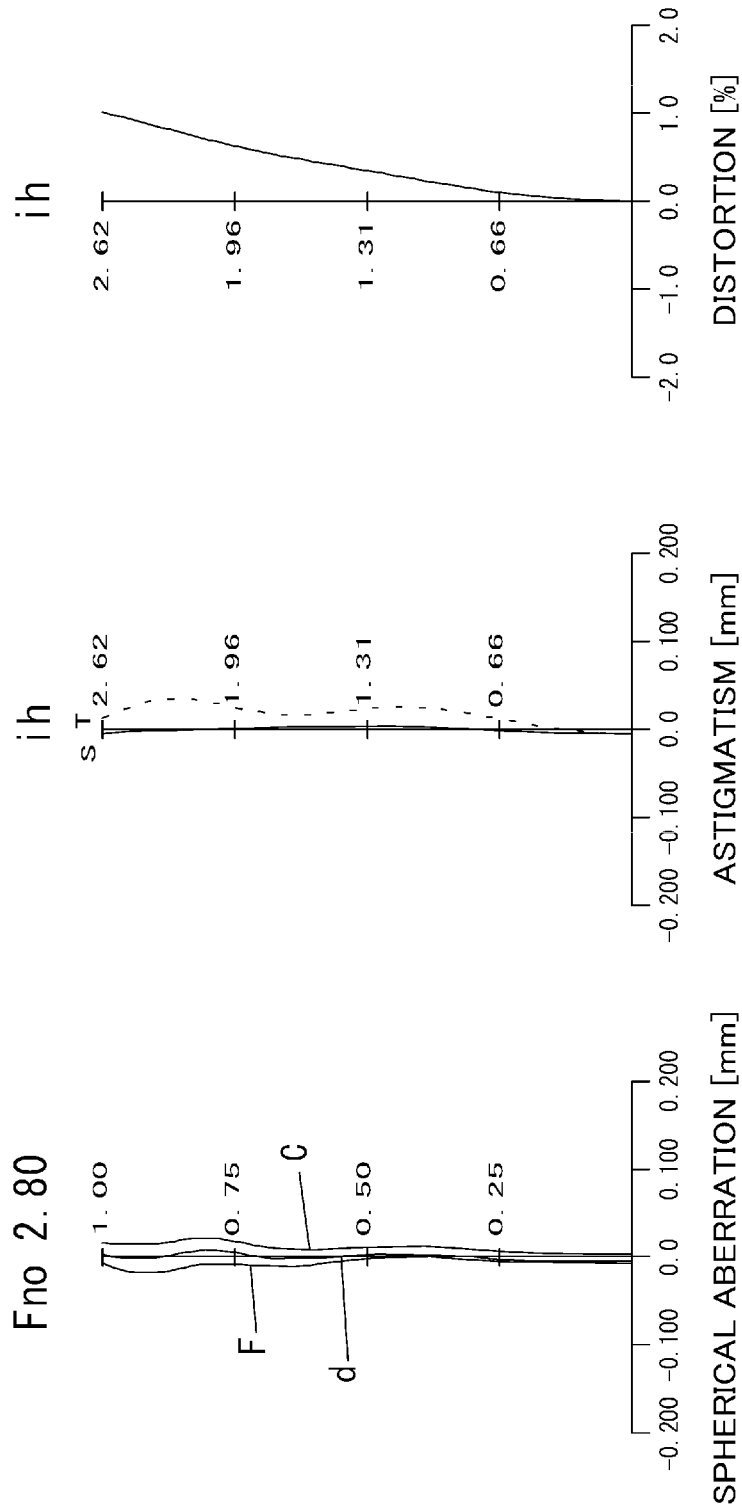
FIG. 4 shows spherical aberration, astigmatism, and distortion of the imaging lens in Example 2 according to the present invention.
Figure 5:
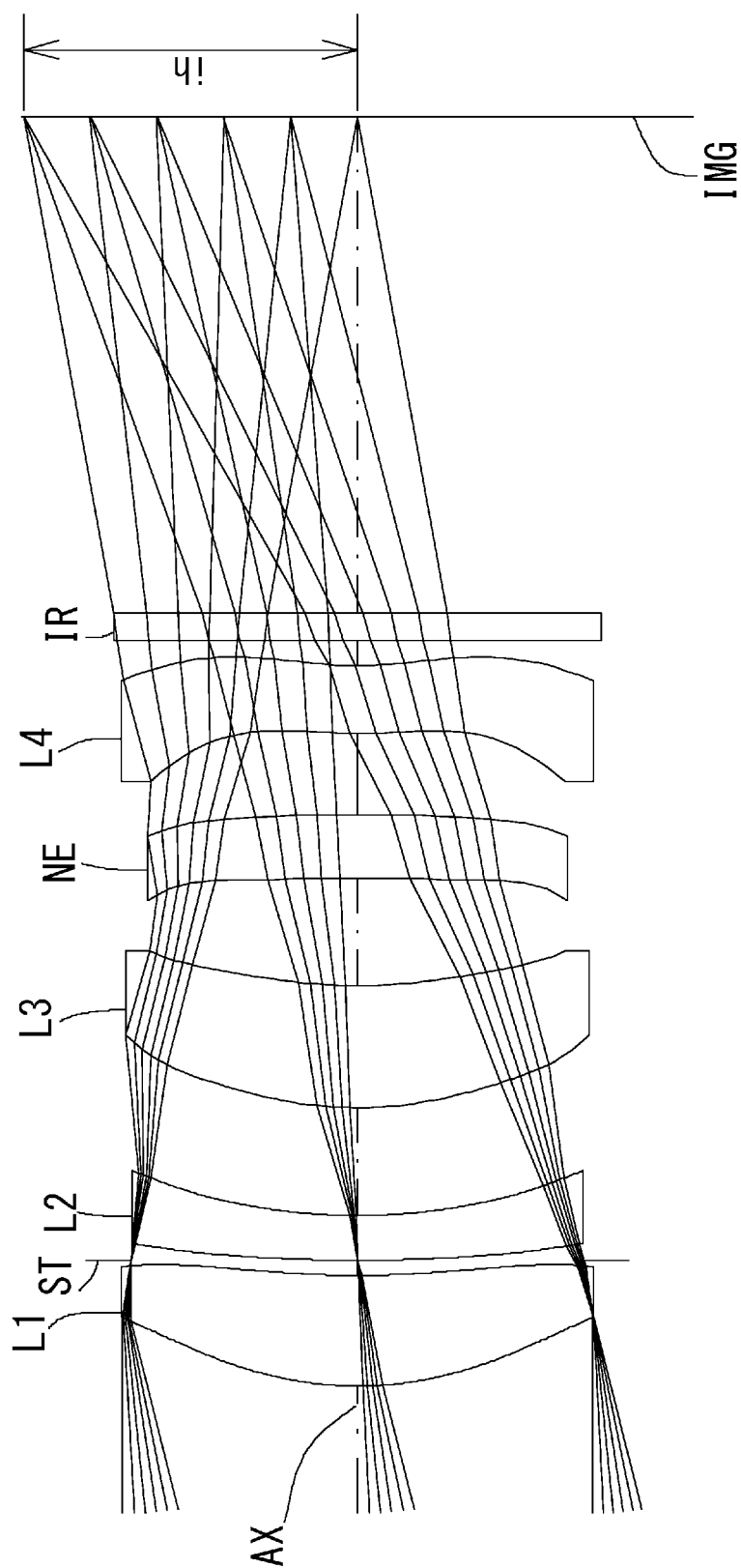
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

| | Example 3 | | | |
|---|---|---|---|---|
| | Unit mm | | | |
| | $f = 10.35$ | | | |
| | $Fno = 2.8$ | | | |
| | $\omega(°) = 14.2$ | | | |
| | $ih = 2.62$ | | | |
| | $TTL = 9.88$ | | | |

Surface Data

| Surface Number i | Curvature Radius r | Surface Distance d | Refractive Index Nd | Abbe Number νd |
|---|---|---|---|---|
| (Object) | Infinity | Infinity | | |
| 1 | Infinity | Infinity | | |
| 2* | 2.8345 | 0.8670 | 1.544 | 55.86 |
| 3* | 7.2677 | 0.1244 | | |
| 4 (Stop) | Infinity | −0.0050 | | |
| 5* | 12.4155 | 0.3503 | 1.650 | 21.54 |
| 6* | 4.6170 | 0.8453 | | |
| 7* | 2.9146 | 0.9584 | 1.535 | 55.66 |
| 8* | 4.2009 | 0.8384 | | |
| 9* | Infinity | 0.6009 | 1.650 | 21.54 |

TABLE 3-continued

Example 3

| | | | | |
|---|---|---|---|---|
| 10* | Infinity | 0.6410 | | |
| 11* | 3.9097 | 0.6312 | 1.535 | 55.66 |
| 12* | 2.7000 | 0.6000 | | |
| 13 | Infinity | 0.2100 | 1.517 | 64.20 |
| 14 | Infinity | 3.5928 | | |
| Image Plane | Infinity | | | |

Constituent Lens Data

| Lens | Start Surface | Focal Length | | Composite Focal Length |
|---|---|---|---|---|
| 1 | 2 | 7.987 | f12 | 18.971 |
| 2 | 5 | −11.506 | f23 | −53.669 |
| 3 | 7 | 14.129 | f34 | 27.618 |
| 4 | 11 | −19.264 | | |

Aspheric Surface Data

| | Second Surface | Third Surface | Fifth Surface | Sixth Surface | Seventh Surface |
|---|---|---|---|---|---|
| k | 0.000000E+00 | 0.000000E+00 | 0.000000E+00 | −6.070000E+00 | 0.000000E+00 |
| A4 | −5.234178E−03 | −1.543855E−02 | −7.997102E−03 | 8.492032E−04 | −1.841052E−02 |
| A6 | −1.079193E−03 | 1.262156E−03 | 5.641456E−03 | 2.716705E−03 | −1.674020E−03 |
| A8 | −3.010493E−04 | −2.766078E−04 | −9.305445E−04 | 1.457414E−04 | −8.830697E−04 |
| A10 | 0.000000E+00 | −3.490244E−05 | 0.000000E+00 | −9.502757E−05 | 2.179098E−03 |
| A12 | 0.000000E+00 | 7.600526E−06 | 0.000000E+00 | −1.909259E−05 | −6.942794E−04 |
| A14 | 0.000000E+00 | 0.000000E+00 | 0.000000E+00 | 0.000000E+00 | 9.278647E−05 |
| A16 | 0.000000E+00 | 0.000000E+00 | 0.000000E+00 | 0.000000E+00 | −3.629464E−06 |

| | Eigth Surface | Ninth Surface | Tenth Surface | Eleventh Surface | Twelth Surface |
|---|---|---|---|---|---|
| k | 0.000000E+00 | 0.000000E+00 | 0.000000E+00 | 0.000000E+00 | 0.000000E+00 |
| A4 | −1.469858E−02 | −2.964626E−02 | −7.936413E−02 | −2.210627E−01 | −1.298394E−01 |
| A6 | −2.415821E−04 | 3.009286E−02 | 8.158646E−02 | 8.061372E−02 | 6.613291E−02 |
| A8 | −5.140643E−03 | −6.159835E−02 | −4.377096E−02 | −5.811941E−02 | −2.269344E−02 |
| A10 | 5.780603E−03 | −1.093386E−02 | 1.492036E−02 | −1.931688E−02 | 3.055249E−03 |
| A12 | −2.130517E−04 | 8.789974E−03 | −4.858856E−03 | 8.616925E−03 | 5.580597E−04 |
| A14 | 3.145809E−04 | −3.121085E−03 | 1.081020E−03 | −1.365524E−03 | −2.234826E−04 |
| A16 | 0.000000E+00 | 4.297570E−04 | −9.101200E−05 | 5.726931E−05 | 1.930696E−03 |

The imaging lens in Example 3 satisfies conditional expressions (1) to (13) as shown in Table 11.

Figure 6:
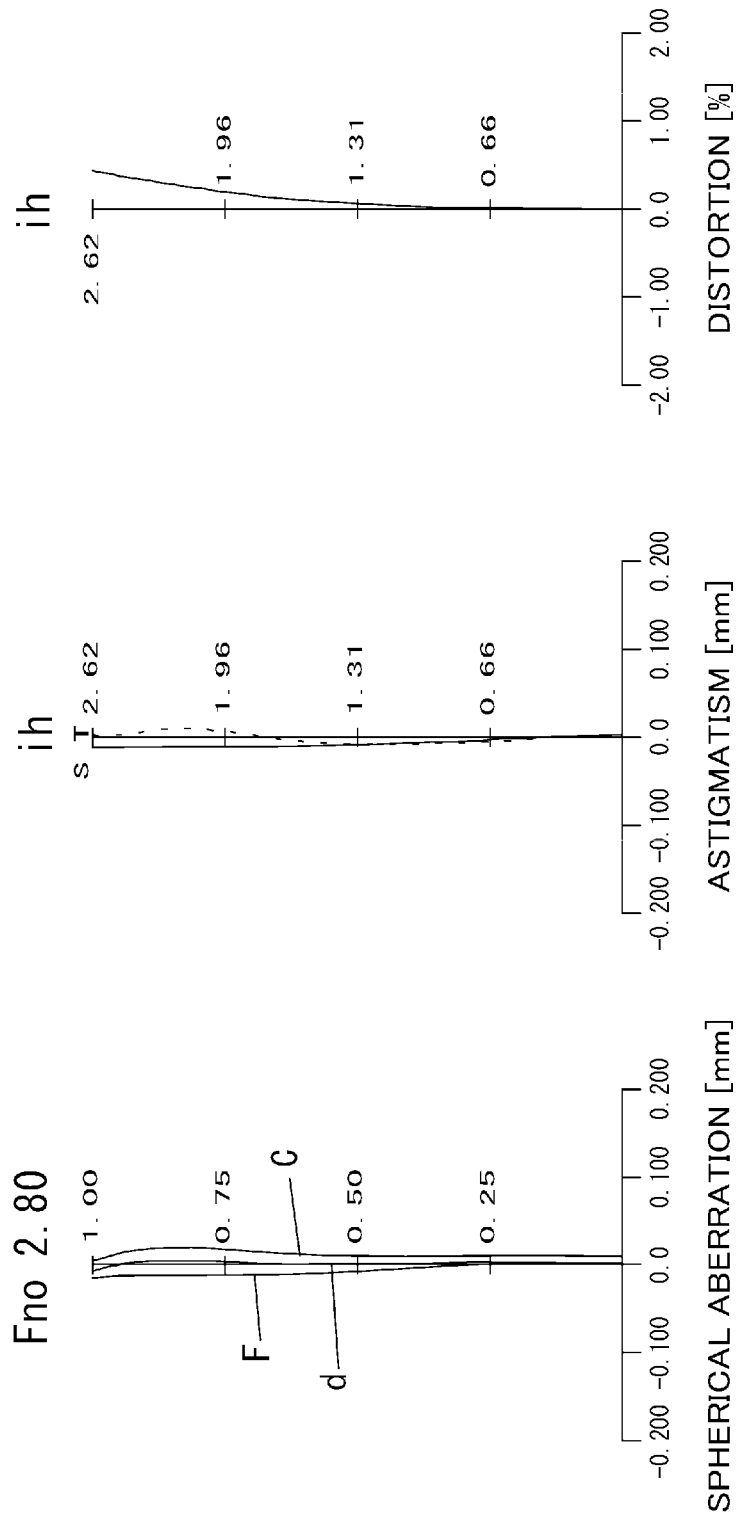
FIG. 6 shows spherical aberration, astigmatism, and distortion of the imaging lens in Example 3 according to the present invention.
Figure 7:
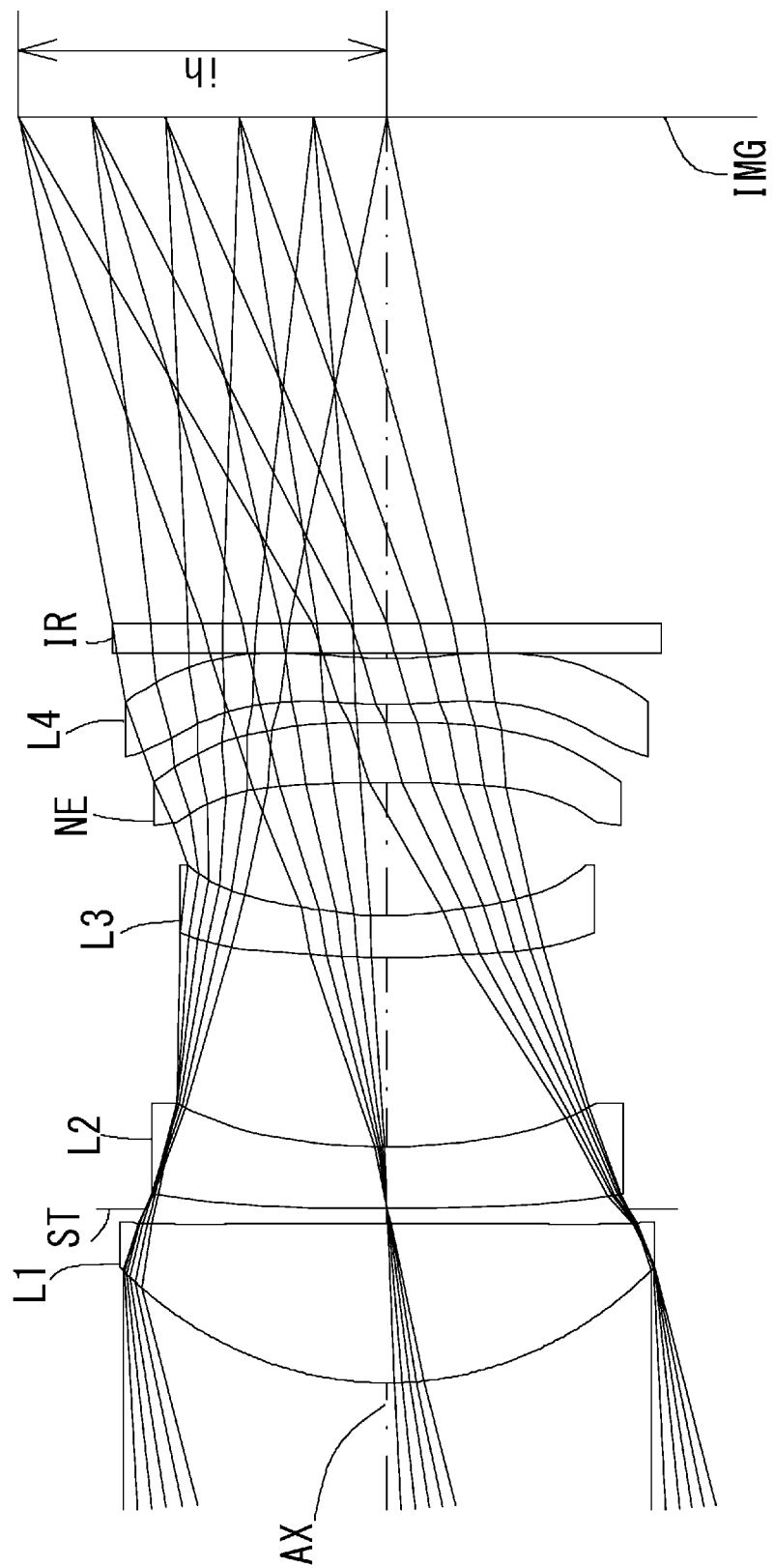
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4

Unit mm $f = 9.90$
$Fno = 2.6$
$\omega(°) = 14.6$
$ih = 2.62$
$TTL = 8.90$

Surface Data

| Surface Number i | Curvature Radius r | Surface Distance d | Refractive Index Nd | Abbe Number vd |
|---|---|---|---|---|
| (Object) | Infinity | Infinity | | |
| 1 | Infinity | Infinity | | |
| 2* | 2.5308 | 1.1340 | 1.544 | 55.86 |
| 3* | −2069.0280 | 0.0975 | | |
| 4 (Stop) | Infinity | 0.0047 | | |
| 5* | 17.3664 | 0.4390 | 1.661 | 20.37 |
| 6* | 4.5432 | 1.3411 | | |

TABLE 4-continued

Example 4

| | | | | |
|---|---|---|---|---|
| 7* | 4.6866 | 0.3000 | 1.535 | 55.66 |
| 8* | 2.5030 | 0.9396 | | |
| 9* | Infinity | 0.4282 | 1.661 | 20.37 |
| 10* | Infinity | 0.1304 | | |
| 11* | 2.9368 | 0.3263 | 1.535 | 55.66 |
| 12* | 3.2383 | 0.3000 | | |
| 13 | Infinity | 0.2100 | 1.517 | 64.20 |
| 14 | infinity | 3.3217 | | |
| Image Plane | Infinity | | | |

Constituent Lens Data

| Lens | Start Surface | Focal Length | | Composite Focal Length |
|---|---|---|---|---|
| 1 | 2 | 4.645 | f12 | 7.315 |
| 2 | 5 | −9.441 | f23 | −4.595 |
| 3 | 7 | −10.550 | f34 | −13.823 |
| 4 | 11 | 42.822 | | |

Aspheric Surface Data

| | Second Surface | Third Surface | Fifth Surface | Sixth Surface | Seventh Surface |
|---|---|---|---|---|---|
| k | 0.000000E+00 | 0.000000E+00 | 0.000000E+00 | −6.080000E+00 | 0.000000E+00 |
| A4 | −4.107324E−04 | −7.557835E−03 | −1.848474E−02 | −5.114836E−03 | −1.254475E−01 |
| A6 | 2.805118E−05 | 3.586297E−03 | 1.681657E−02 | 2.319237E−02 | 1.006195E−01 |
| A8 | −4.668923E−04 | −2.452053E−04 | −4.109219E−03 | −9.474571E−03 | −1.503095E−02 |
| A10 | 8.151119E−05 | −2.706636E−05 | 4.807371E−04 | 3.843876E−03 | −2.213184E−02 |
| A12 | 0.000000E+00 | −3.373375E−06 | −5.734298E−05 | −1.406831E−03 | 1.726926E−02 |
| A14 | 0.000000E+00 | 6.170776E−08 | 0.000000E+00 | 2.416671E−04 | −5.044697E−03 |
| A16 | 0.000000E+00 | 0.000000E+00 | 0.000000E+00 | −1.705040E−05 | 4.887430E−04 |

| | Eighth Surface | Ninth Surface | Tenth Surface | Eleventh Surface | Twelfth Surface |
|---|---|---|---|---|---|
| k | 0.000000E+00 | 0.000000E+00 | 0.000000E+00 | 0.000000E+00 | −9.000000E+00 |
| A4 | −1.630424E−01 | −6.627008E−02 | −2.146244E−01 | −3.996676E−01 | −1.758609E−01 |
| A6 | 1.333784E−01 | 1.572419E−03 | 2.515114E−01 | 3.707728E−01 | 1.183279E−01 |
| A8 | −4.349255E−02 | 5.137366E−02 | −1.804595E−01 | −2.364812E−01 | −6.281345E−02 |
| A10 | −2.453462E−03 | −7.350033E−02 | 7.041214E−02 | 8.748925E−02 | 2.075816E−02 |
| A12 | 8.650524E−03 | 4.442658E−02 | −1.508759E−02 | −1.784329E−02 | −3.906984E−03 |
| A14 | −2.113240E−03 | −1.348266E−02 | 1.554788E−03 | 1.892217E−03 | 3.668059E−04 |
| A16 | 0.000000E+00 | 1.716118E−03 | −3.255704E−05 | −8.357740E−05 | −1.169629E−05 |

The imaging lens in Example 4 satisfies conditional expressions (1) to (13) as shown in Table 11.

Figure 8:
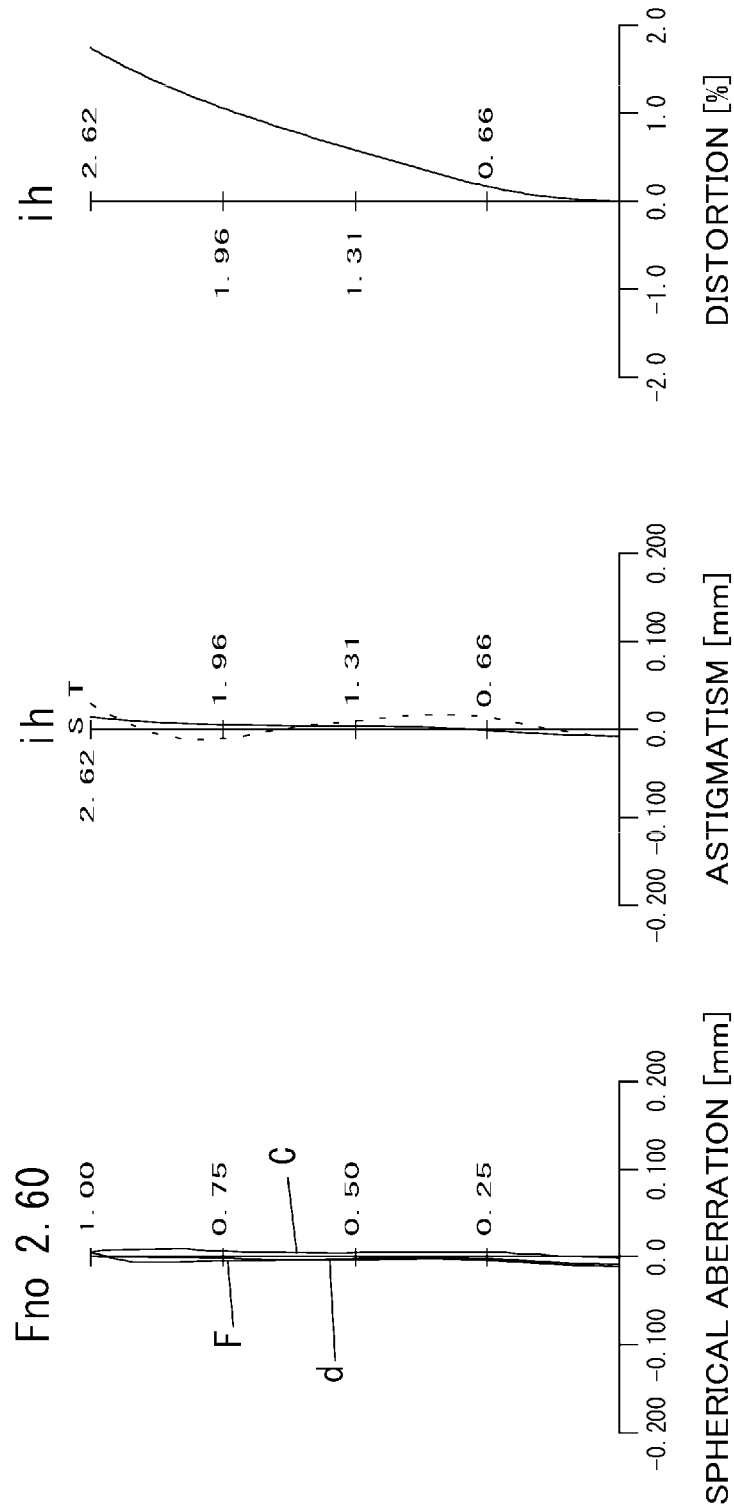
FIG. 8 shows spherical aberration, astigmatism, and distortion of the imaging lens in Example 4 according to the present invention.
Figure 9:
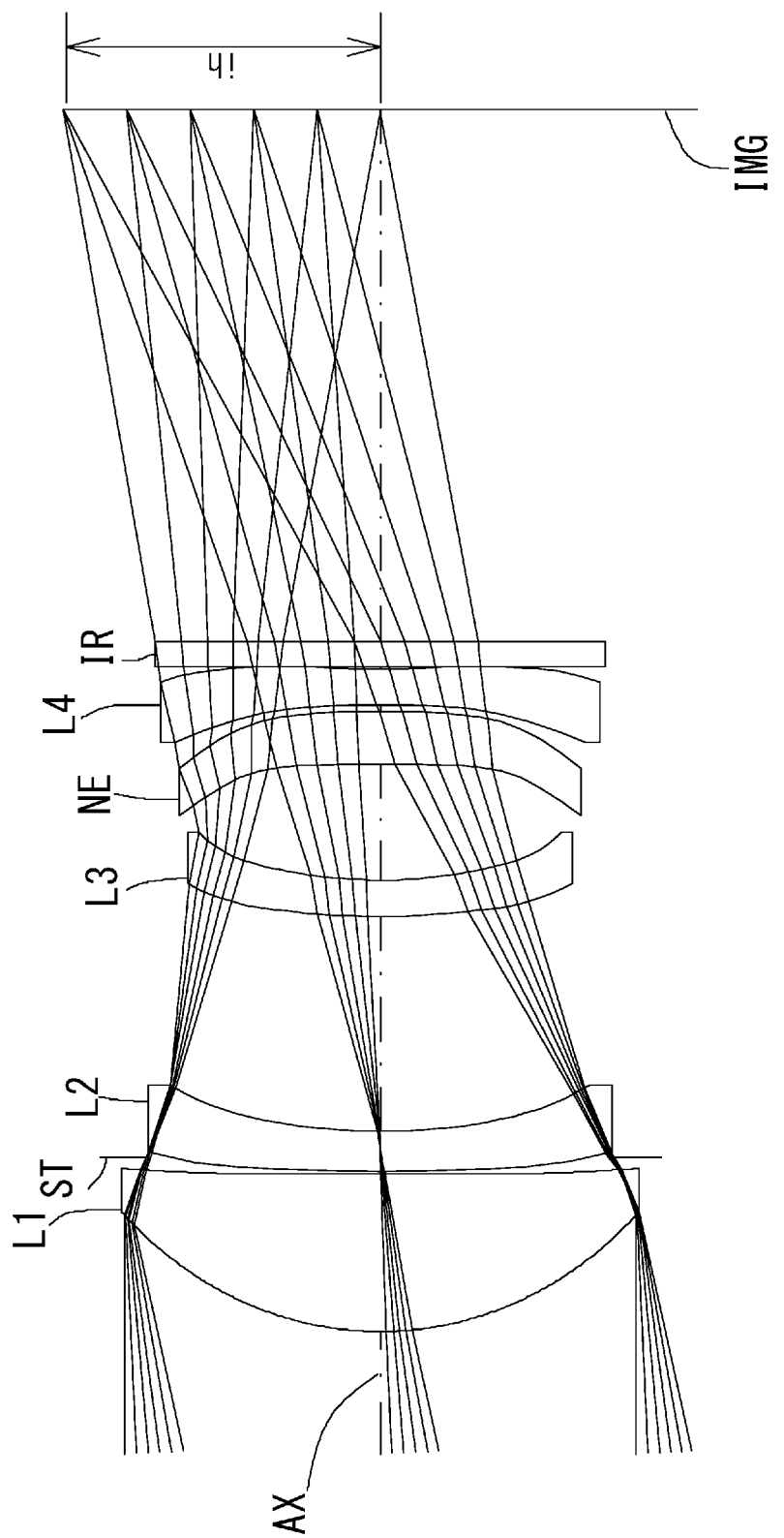
FIG. 9 is a schematic view showing a general configuration of an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5

Unit mm f = 12.00
Fno = 2.8
ω(°) = 12.3
ih = 2.62
TTL = 10.18

Surface Data

| Surface Number i | Curvature Radius r | Surface Distance d | Refractive Index Nd | Abbe Number vd |
|---|---|---|---|---|
| (Object) | Infinity | Infinity | | |
| 1 | Infinity | Infinity | | |
| 2* | 2.7573 | 1.3000 | 1.544 | 55.86 |
| 3* | 407.4974 | 0.1390 | | |

TABLE 5-continued

| Example 5 | | | | |
|---|---|---|---|---|
| 4 ( Stop ) | Infinity | −0.1160 | | |
| 5* | 17.3402 | 0.3300 | 1.661 | 20.37 |
| 6* | 4.8939 | 1.7763 | | |
| 7* | 5.4053 | 0.3000 | 1.535 | 55.66 |
| 8* | 3.3403 | 0.9569 | | |
| 9* | Infinity | 0.4397 | 1.661 | 20.37 |
| 10* | Infinity | 0.0500 | | |
| 11* | 10.9519 | 0.3000 | 1.535 | 55.66 |
| 12* | 7.0499 | 0.5000 | | |
| 13 | Infinity | 0.2100 | 1.517 | 64.20 |
| 14 | Infinity | 4.0646 | | |
| Image Plane | Infinity | | | |

Constituent Lens Data

| Lens | Start Surface | Focal Length | | Composite Focal Length |
|---|---|---|---|---|
| 1 | 2 | 5.094 | f12 | 8.194 |
| 2 | 5 | −10.429 | f23 | −6.009 |
| 3 | 7 | −17.220 | f34 | −11.538 |
| 4 | 11 | −38.016 | | |

Aspheric Surface Data

| | Second Surface | Third Surface | Fifth Surface | Sixth Surface | Seventh Surface |
|---|---|---|---|---|---|
| k | 0.000000E+00 | 0.000000E+00 | 0.000000E+00 | −6.060000E+00 | 0.000000E+00 |
| A4 | −4.287561E−05 | −8.336338E−04 | −1.295548E−02 | −7.899859E−03 | −4.239411E−02 |
| A6 | 2.168369E−04 | 1.581347E−03 | 9.218452E−03 | 1.726469E−02 | 8.160367E−03 |
| A8 | −1.194331E−04 | −1.335636E−04 | −1.652884E−03 | −1.000932E−02 | 5.503224E−02 |
| A10 | 1.440273E−06 | −2.312744E−05 | 1.488785E−04 | 5.562852E−03 | −6.600477E−02 |
| A12 | 0.000000E+00 | −6.820433E−07 | −1.207766E−05 | −1.98,4591E−03 | 3.614931E−02 |
| A14 | 0.000000E+00 | 4.405095E−07 | 0.000000E+00 | 3.800608E−04 | −9.565310E−03 |
| A16 | 0.000000E+00 | 0.000000E+00 | 0.000000E+00 | −3.105163E−05 | 9.657739E−04 |

| | Eighth Surface | Ninth Surface | Tenth Surface | Eleventh Surface | Twelfth Surface |
|---|---|---|---|---|---|
| k | 0.000000E+00 | 0.000000E+00 | 0.000000E+00 | 0.000000E+00 | −9.000000E+00 |
| A4 | −6.994229E−02 | −5.642827E−02 | −3.067394E−01 | −4.267998E−01 | −1.027730E−01 |
| A6 | 5.666739E−02 | 9.534037E−03 | 5.933960E−01 | 7.878634E−01 | 9.661222E−02 |
| A8 | −6.116596E−03 | 2.030091E−02 | −6.779832E−01 | −8.823656E−01 | −8.212454E−02 |
| A10 | −1.687960E−02 | −4.940992E−02 | 4.333873E−01 | 5.829211E−01 | 5.128394E−02 |
| A12 | 1.182567E−02 | 2.855856E−02 | −1.599873E−01 | −2.224258E−01 | −1.972570E−02 |
| A14 | −2.241556E−03 | −6.033268E−03 | 3.200299E−02 | 4.515926E−02 | 3.996862E−03 |
| A16 | 0.000000E+00 | 3.804451E−04 | −2.674820E−03 | −3.762493E−03 | −3.240814E−04 |

The imaging lens in Example 5 satisfies conditional expressions (1) to (13) as shown in Table 11.

Figure 10:
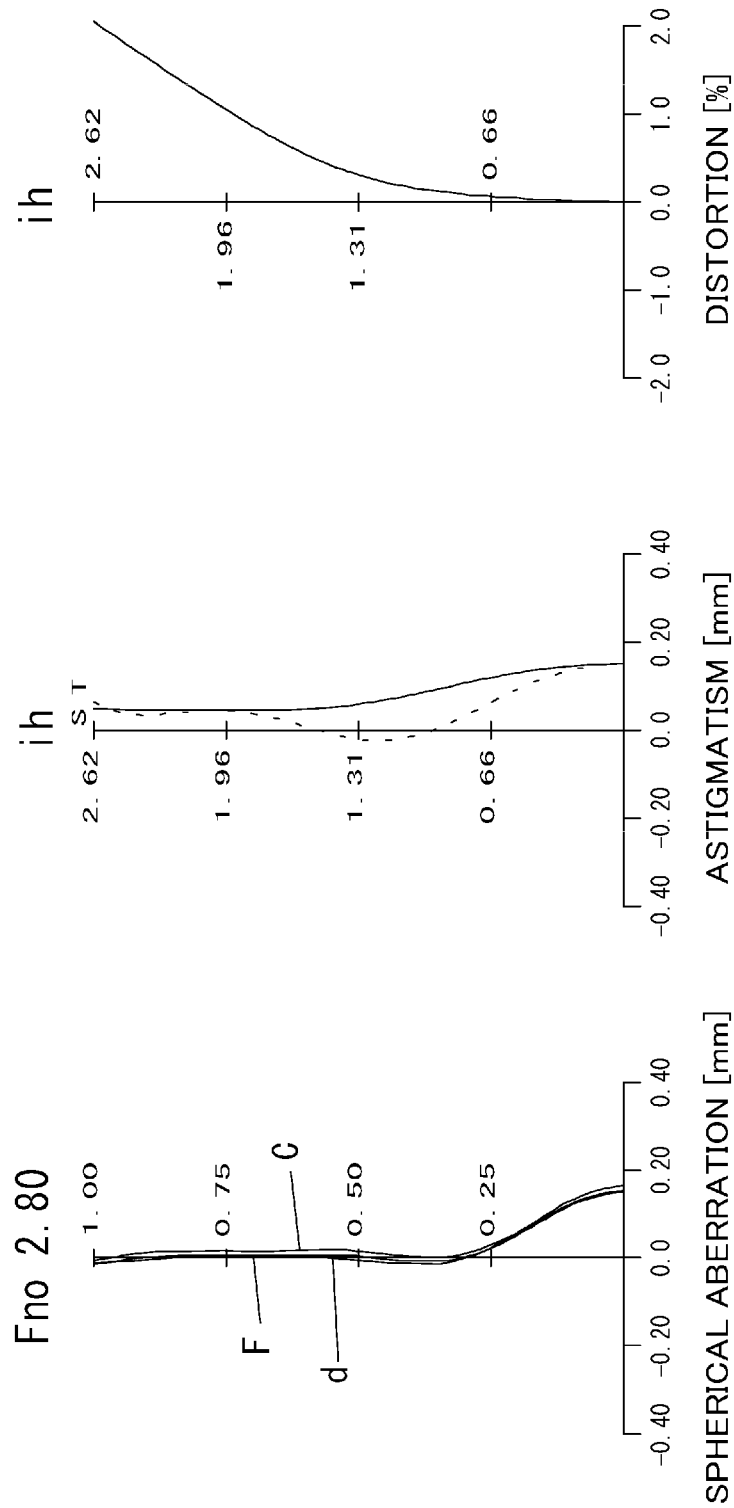
FIG. 10 shows spherical aberration, astigmatism, and distortion of the imaging lens in Example 5 according to the present invention.
Figure 11:
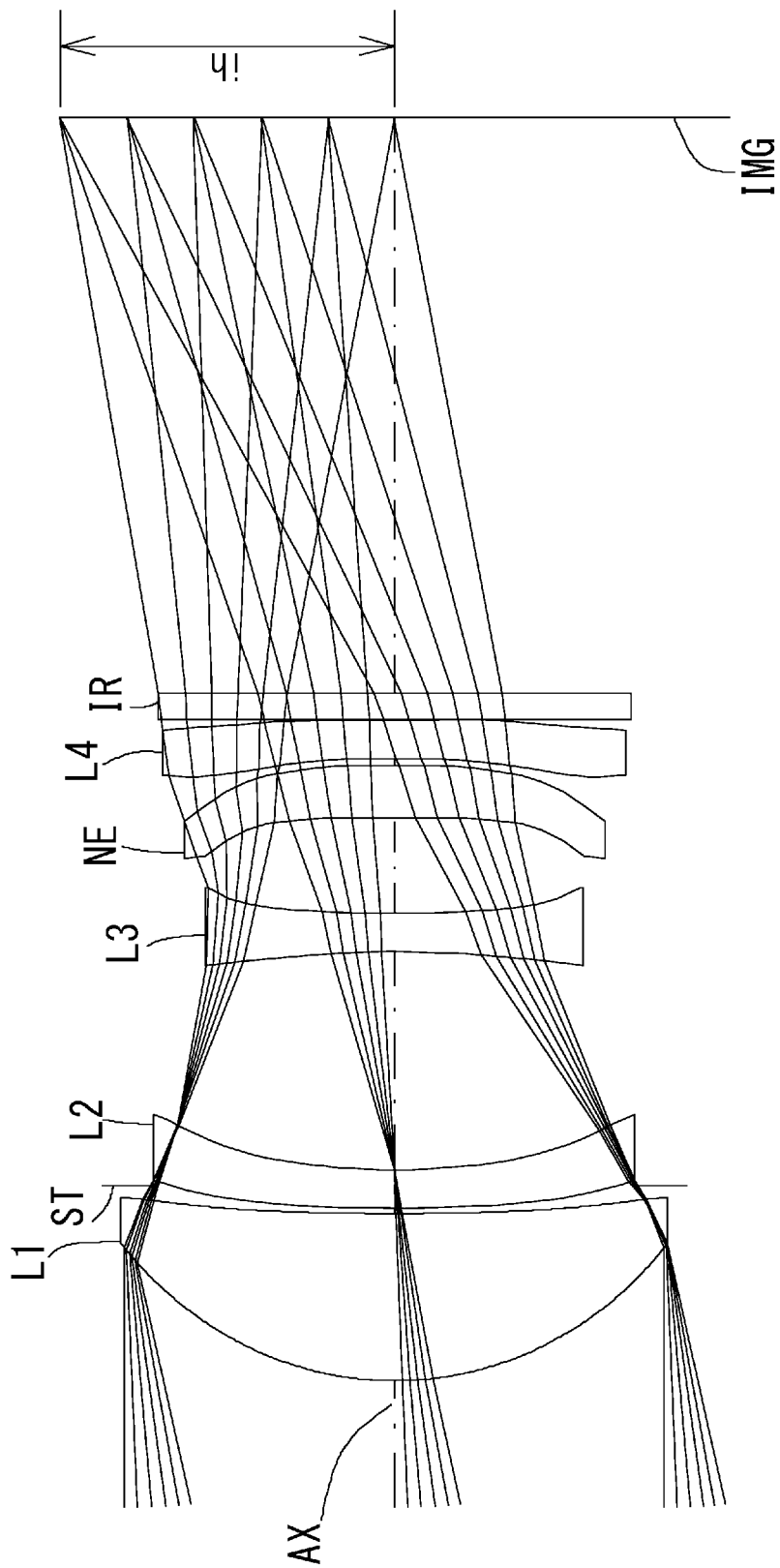
FIG. 11 is a schematic view showing the general configuration of an imaging lens in Example 6 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

| Example 6 |
| --- |

| Unit mm |
| --- |

| f = 12.00 |
| Fno = 2.8 |
| ω(°) = 12.5 |
| ih = 2.62 |
| TTL = 10.07 |

| Surface Data | | | | |
| --- | --- | --- | --- | --- |
| Surface Number i | Curvature Radius r | Surface Distance d | Refractive Index Nd | Abbe Number vd |
| ( Object ) | Infinity | Infinity | | |
| 1 | Infinity | Infinity | | |
| 2* | 2.6101 | 1.3090 | 1.553 | 71.68 |
| 3* | 21.6890 | 0.2171 | | |
| 4 ( Stop ) | Infinity | −0.1741 | | |
| 5* | 11.0124 | 0.3000 | 1.661 | 20.37 |
| 6* | 5.0186 | 1.7098 | | |
| 7* | −13.0628 | 0.3000 | 1.535 | 55.66 |
| 8* | 7.2164 | 0.7491 | | |
| 9* | Infinity | 0.4116 | 1.661 | 20.37 |
| 10* | Infinity | 0.0500 | | |
| 11* | 10.8284 | 0.3000 | 1.535 | 55.66 |
| 12* | 13.1968 | 0.5000 | | |
| 13 | Infinity | 0.2100 | 1.517 | 64.20 |
| 14 | Infinity | 4.2580 | | |
| Image Plane | Infinity | | | |

| Constituent Lens Data | | | | |
| --- | --- | --- | --- | --- |
| Lens | Start Surface | Focal Length | | Composite Focal Length |
| 1 | 2 | 5.235 | f12 | 7.222 |
| 9 | 5 | −14.238 | f23 | −5.012 |
| 3 | 7 | −8.647 | f34 | −9.424 |
| 4 | 11 | 108.046 | | |

| Aspheric Surface Data | | | | | |
| --- | --- | --- | --- | --- | --- |
| | Second Surface | Third Surface | Fifth Surface | Sixth Surface | Seventh Surface |
| k | 0.000000E+00 | 0.000000E+00 | 0.000000E+00 | −6.080000E+00 | 0.000000E+00 |
| A4 | 1.924316E−04 | −1.147623E−03 | −1.905004E−02 | −1.756461E−02 | −6.738738E−02 |
| A6 | −1.684336E−04 | 1.461546E−03 | 1.736622E−02 | 2.976244E−02 | 4.100722E−02 |
| A8 | −5.793915E−05 | −1.322531E−03 | −5.349500E−03 | −1.749609E−02 | 8.067919E−02 |
| A10 | −2.453470E−06 | −1.703886E−05 | 9.817000E−04 | 8.391846E−03 | −1.399091E−01 |
| A12 | 0.000000E+00 | −8.996783E−08 | −9.245059E−05 | −2.773491E−03 | 9.078331E−02 |
| A14 | 0.000000E+00 | −2.614900E−08 | 0.000000E+00 | 5.313835E−04 | −2.749752E−02 |
| A16 | 0.000000E+00 | 0.000000E+00 | 0.000000E+00 | −4.593963E−05 | 3.187747E−03 |
| | Eighth Surface | Ninth Surface | Tenth Surface | Eleventh Surface | Twelfth Surface |
| k | 0.000000E+00 | 0.000000E+00 | 0.000000E+00 | 0.000000E+00 | −9.000000E+00 |
| A4 | −1.095502E−01 | −8.571128E−02 | −3.135403E−01 | −3.907639E−01 | −8.212220E−02 |
| A6 | 1.631097E−01 | 7.132122E−02 | 5.431480E−01 | 6.412870E−01 | 5.440330E−02 |
| A8 | −9.332872E−02 | −1.477621E−03 | −4.907970E−01 | −6.255188E−01 | −4.645210E−02 |
| A10 | 1.638625E−02 | −5.887492E−02 | 2.262353E−01 | 3.673216E−01 | 3.891956E−02 |
| A12 | 5.871895E−03 | 3.197182E−02 | −5.351967E−02 | −1.256184E−01 | −1.815730E−02 |
| A14 | −1.844373E−03 | −5.106155E−03 | 5.329476E−03 | 2.301281E−02 | 4.086032E−03 |
| A16 | 0.000000E+00 | 1.356969E−04 | −2.083138E−05 | −1.741061E−03 | −3.517601E−04 |

The imaging lens in Example 6 satisfies conditional expressions (1) to (13) as shown in Table 11.

Figure 12:
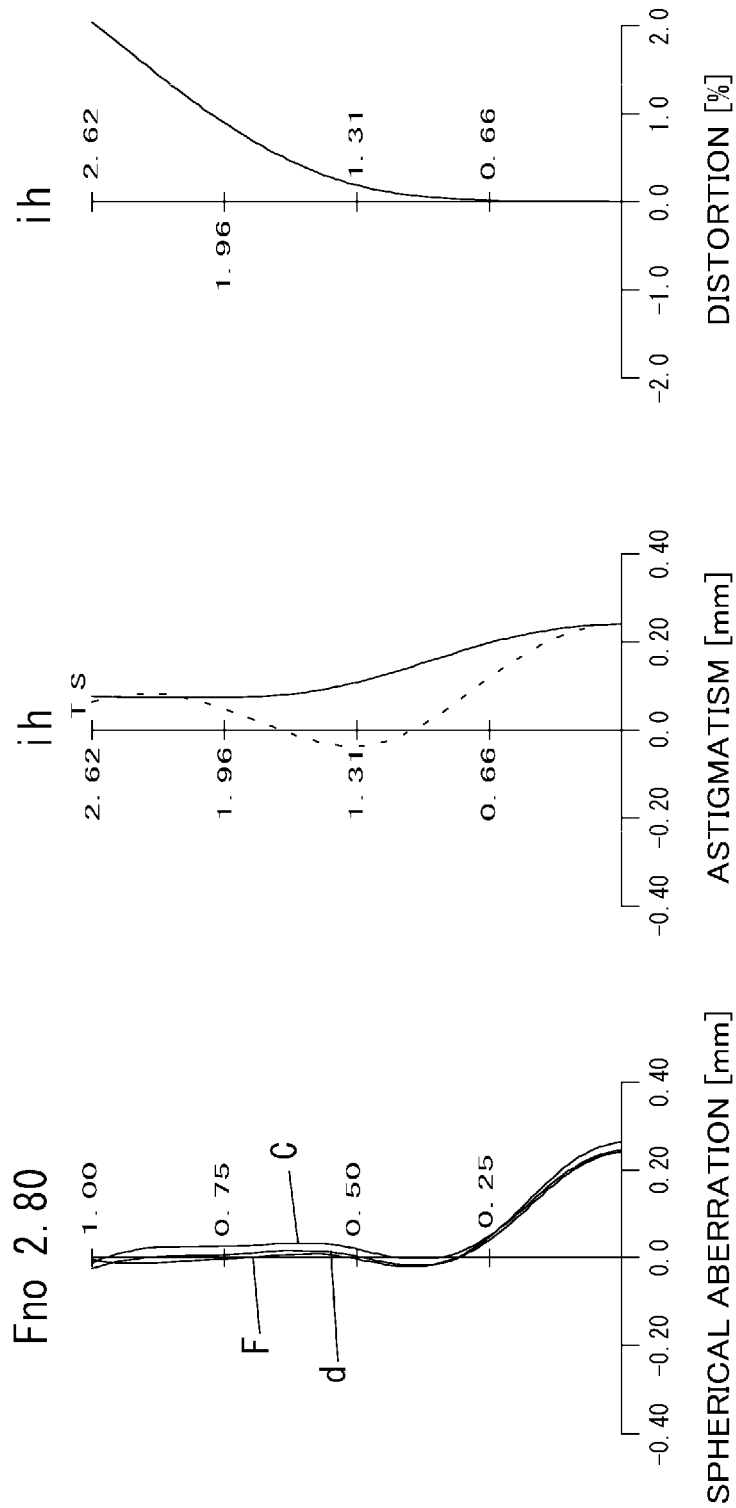
FIG. 12 shows spherical aberration, astigmatism, and distortion of the imaging lens in Example 6 according to the present invention.
Figure 13:
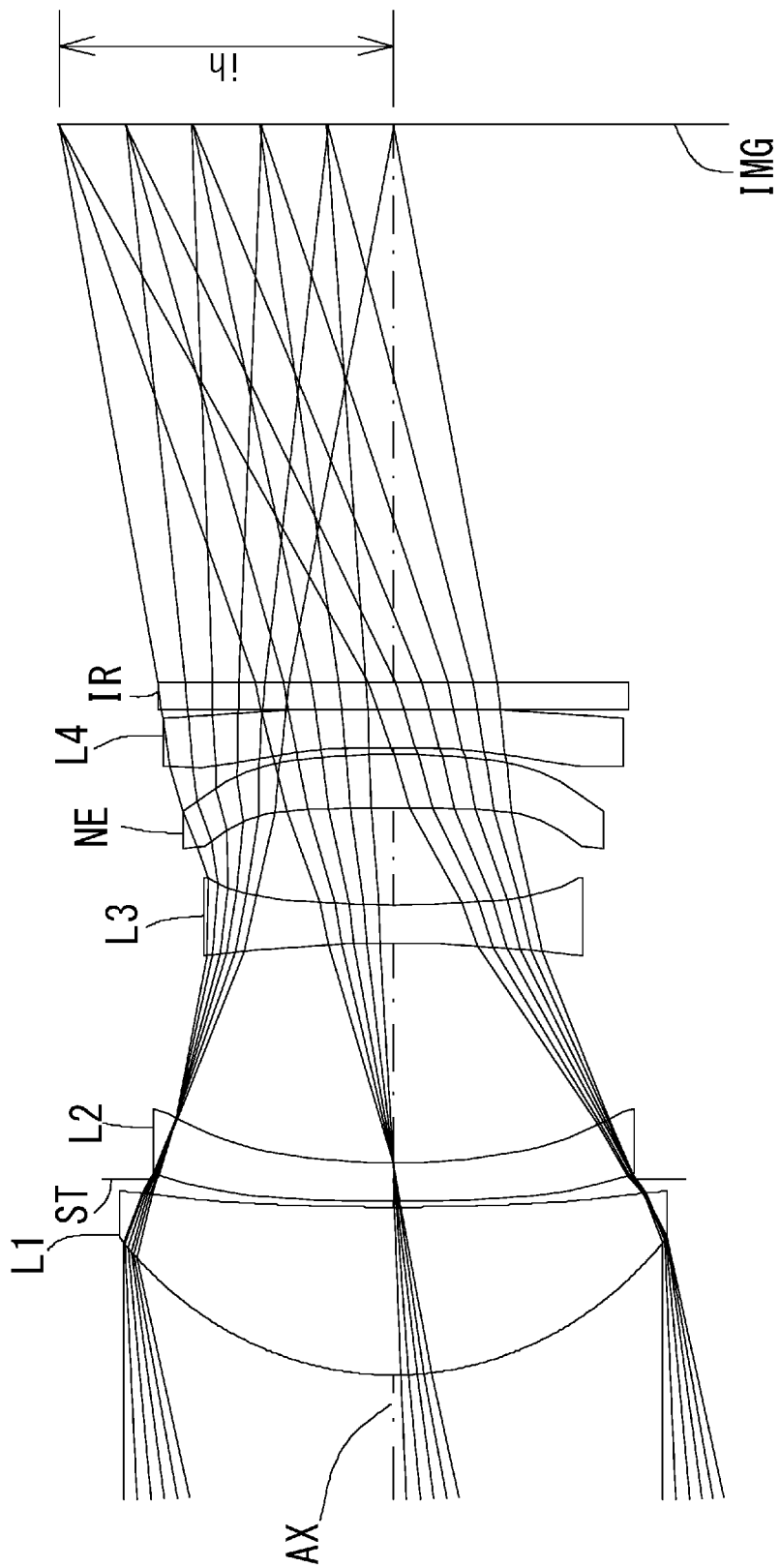
FIG. 13 is a schematic view showing the general configuration of an imaging lens in Example 7 according to the present invention.

FIG. 12 shows spherical aberration (mm), astigmatism (mm), and distortion (%) of the imaging lens in Example 6. As shown in FIG. 12, each aberration is corrected excellently.

Example 7

The basic lens data is shown below in Table 7.

TABLE 7

Example 7

Unit mm f = 12.00
Fno = 2.8
ω(°) = 12.5
ih = 2.62
TTL = 9.97

Surface Data

| Surface Number i | Curvature Radius r | Surface Distance d | Refractive Index Nd | Abbe Number vd |
|---|---|---|---|---|
| ( Object ) | Infinity | Infinity | | |
| 1 | Infinity | Infinity | | |
| 2* | 2.5988 | 1.3160 | 1.553 | 71.68 |
| 3* | 22.5576 | 0.2165 | | |
| 4 ( Stop ) | Infinity | −0.1724 | | |
| 5* | 11.2633 | 0.3000 | 1.661 | 20.37 |
| 6* | 5.0332 | 1.7232 | | |
| 7* | −16.6134 | 0.3000 | 1.535 | 55.66 |
| 8* | 6.5581 | 0.7588 | | |
| 9* | Infinity | 0.4182 | 1.661 | 20.37 |
| 10* | Infinity | 0.0500 | | |
| 11* | 11.1757 | 0.3000 | 1.535 | 55.66 |
| 12* | 11.6989 | 0.5000 | | |
| 13 | Infinity | 0.2100 | 1.517 | 64.20 |
| 14 | Infinity | 4.1201 | | |
| Image Plane | Infinity | | | |

Constituent Lens Data

| Lens | Start Surface | Focal Length | | Composite Focal Length |
|---|---|---|---|---|
| 1 | 2 | 5.186 | f12 | 7.163 |
| 2 | 5 | −14.040 | f23 | −5.014 |
| 3 | 7 | −8.752 | f34 | −8.898 |
| 4 | 11 | 389.449 | | |

Aspheric Surface Data

| | Second Surface | Third Surface | Fifth Surface | Sixth Surface | Seventh Surface |
|---|---|---|---|---|---|
| k | 0.000000E+00 | 0.000000E+00 | 0.000000E+00 | −6.060000E+00 | 0.000000E+00 |
| A4 | 1.434410E−04 | −1.087279E−03 | −2.048450E−02 | −1.874233E−02 | −6.282669E−02 |
| A6 | −1.870464E−04 | 1.481661E−03 | 1.888627E−02 | 3.057130E−02 | 2.397201E−02 |
| A8 | −6.049370E−05 | −1.293384E−04 | −5.968780E−03 | −1.715101E−02 | 1.134866E−01 |
| A10 | −2.762434E−06 | −1.702788E−05 | 1.114569E−03 | 7.847718E−03 | −1.743152E−01 |
| A12 | 0.000000E+00 | −2.293318E−07 | −1.056511E−04 | −2.524851E−03 | 1.105866E−01 |
| A14 | 0.000000E+00 | −8.741376E−08 | 0.000000E+00 | 4.765406E−04 | −3.346821E−02 |
| A16 | 0.000000E+00 | 0.000000E+00 | 0.000000E+00 | −4.134003E−05 | 3.912551E−03 |

| | Eighth Surface | Ninth Surface | Tenth Surface | Eleventh Surface | Twelfth Surface |
|---|---|---|---|---|---|
| k | 0.000000E+00 | 0.000000E+00 | 0.000000E+00 | 0.000000E+00 | −9.000000E+00 |
| A4 | −1.087712E−01 | −8.393551E−02 | −3.315159E−01 | −4.270176E−01 | −9.341958E−02 |
| A6 | 1.642859E−01 | 7.877161E−02 | 5.997724E−01 | 7.255711E−01 | 7.026835E−02 |
| A8 | −9.403562E−02 | −2.710897E−02 | −5.723663E−01 | −7.192553E−01 | −5.444581E−02 |
| A10 | 1.692484E−02 | −3.144692E−02 | 2.862533E−01 | 4.264328E−01 | 4.016551E−02 |
| A12 | 5.545004E−03 | 1.807658E−02 | −7.702218E−02 | −1.468955E−01 | −1.790453E−02 |
| A14 | −1.814042E−03 | −1.680778E−03 | 9.995180E−03 | 2.708110E−02 | 3.988995E−03 |
| A16 | 0.000000E+00 | −1.945994E−04 | −3.901168E−04 | −2.061903E−03 | −3.445289E−04 |

The imaging lens in Example 7 satisfies conditional expressions (1) to (13) as shown in Table 11.

Figure 14:
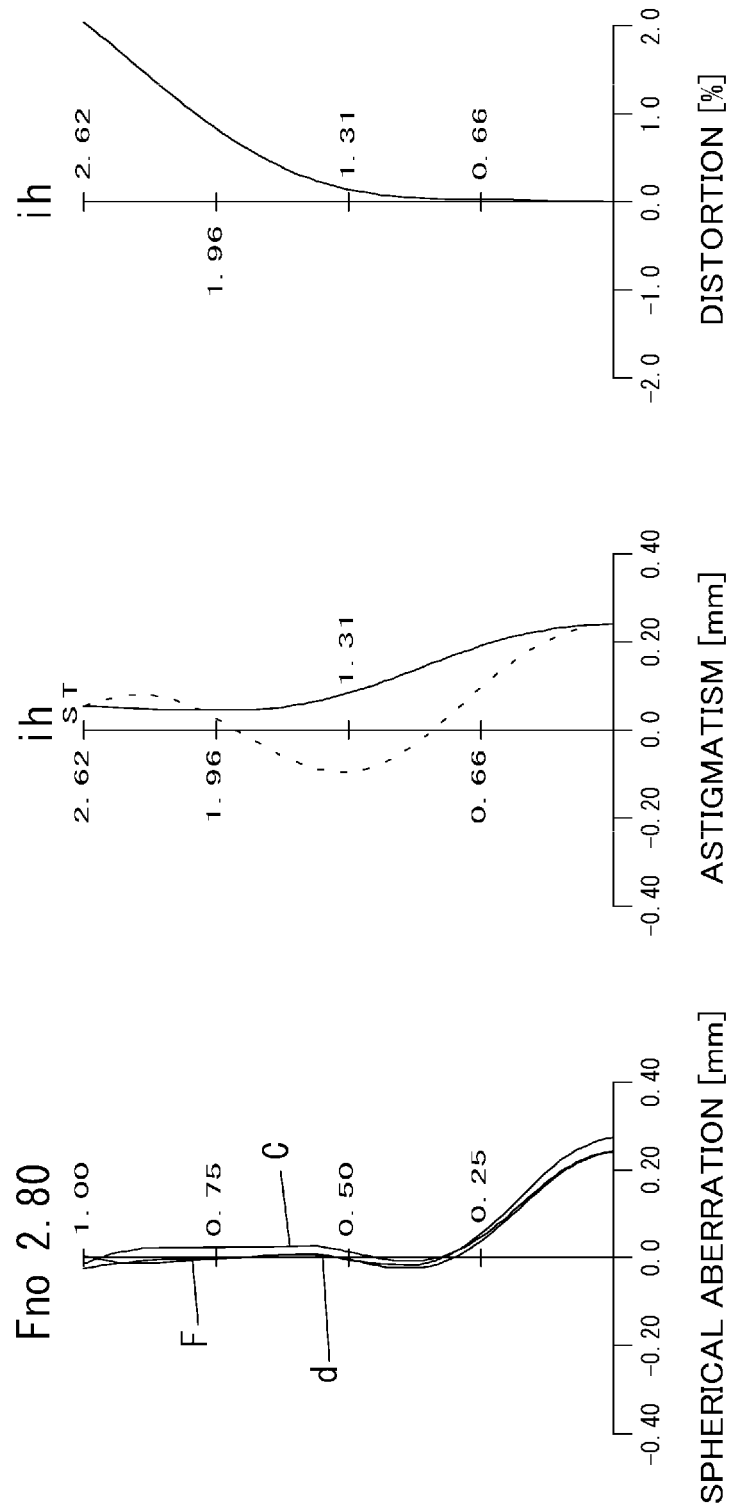
FIG. 14 shows spherical aberration, astigmatism, and distortion of the imaging lens in Example 7 according to the present invention.
Figure 15:
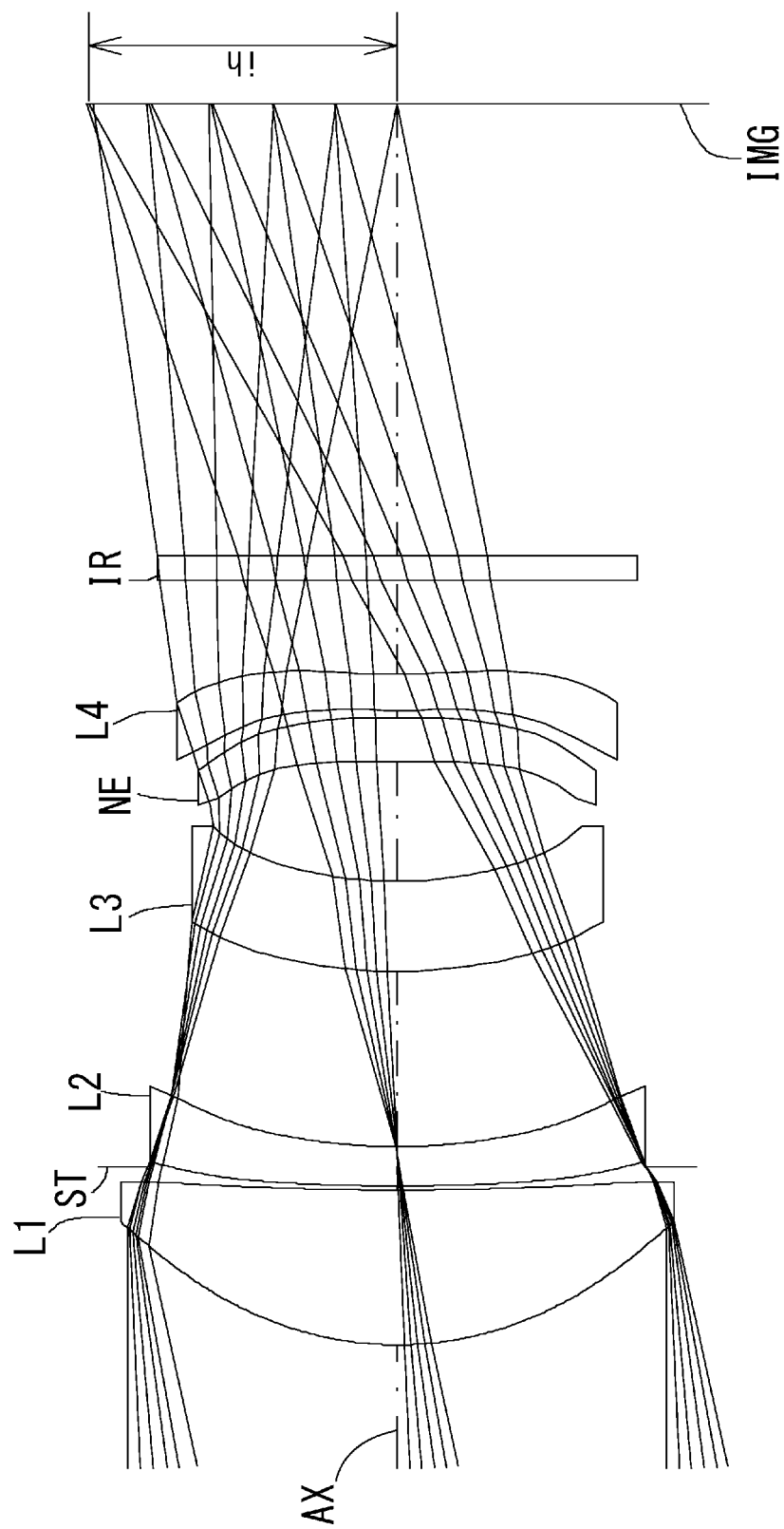
FIG. 15 is a schematic view showing the general configuration of an imaging lens in Example 8 according to the present invention.

FIG. 14 shows spherical aberration (mm), astigmatism (mm), and distortion (%) of the imaging lens in Example 7. As shown in FIG. 14, each aberration is corrected excellently.

Example 8

The basic lens data is shown below in Table 8.

TABLE 8

| Example 8 |
|---|
| Unit mm |
| f = 12.00 |
| Fno = 2.6 |
| ω(°) = 12.5 |
| ih = 2.62 |
| TTL = 10.57 |

Surface Data

| Surface Number i | Curvature Radius r | Surface Distance d | Refractive Index Nd | Abbe Number vd |
|---|---|---|---|---|
| ( Object ) | Infinity | Infinity | | |
| 1 | Infinity | Infinity | | |
| 2* | 2.8946 | 1.3050 | 1.544 | 55.86 |
| 3* | 28.4522 | 0.1973 | | |
| 4 ( Stop ) | Infinity | −0.1634 | | |
| 5* | 15.3702 | 0.3321 | 1.661 | 20.37 |
| 6* | 4.9478 | 1.4770 | | |
| 7* | 4.0881 | 0.7572 | 1.535 | 55.66 |
| 8* | 3.0544 | 1.0120 | | |
| 9* | Infinity | 0.3688 | 1.661 | 20.37 |
| 10* | Infinity | 0.0641 | | |
| 11* | 6.0643 | 0.3000 | 1.535 | 55.66 |
| 12* | 4.9352 | 0.7880 | | |
| 13 | Infinity | 0.2100 | 1.517 | 64.20 |
| 14 | Infinity | 3.9956 | | |
| Image Plane | Infinity | | | |

Constituent Lens Data

| Lens | Start Surface | Focal Length | | Composite Focal Length |
|---|---|---|---|---|
| 1 | 2 | 5.816 | f12 | 9.817 |
| 2 | 5 | −11.185 | f23 | −7.453 |
| 3 | 7 | −30.329 | f34 | −19.387 |
| 4 | 11 | −54.621 | | |

Aspheric Surface Data

| | Second Surface | Third Surface | Fifth Surface | Sixth Surface | Seventh Surface |
|---|---|---|---|---|---|
| k | 0.000000E+00 | 0.000000E+00 | 0.000000E+00 | −6.050000E+00 | 0.000000E+00 |
| A4 | −1.771667E−03 | −2.193891E−03 | −5.317759E−03 | −1.550873E−03 | −8.469342E−03 |
| A6 | 3.195294E−04 | 1.246537E−03 | 2.939068E−03 | 6.027491E−03 | −1.649764E−02 |
| A8 | −1.090329E−04 | −1.543791E−04 | 2.105347E−04 | −1.346818E−03 | 3.186224E−02 |
| A10 | −9.725341E−06 | −1.833102E−05 | −1.265847E−04 | 2.345925E−04 | −2.148406E−02 |
| A12 | 0.000000E+00 | 1.285392E−06 | 6.159471E−06 | 8.236647E−05 | 7.791396E−03 |
| A14 | 0.000000E+00 | 1.794405E−07 | 0.000000E+00 | −5.221581E−05 | −1.431143E−03 |
| A16 | 0.000000E+00 | 0.000000E+00 | 0.000000E+00 | 5.969376E−06 | 9.824146E−05 |

| | Eighth Surface | Ninth Surface | Tenth Surface | Eleventh Surface | Twelfth Surface |
|---|---|---|---|---|---|
| k | 0.000000E+00 | 0.000000E+00 | 0.000000E+00 | 0.000000E+00 | −9.000000E+00 |
| A4 | −4.040501E−02 | −8.016024E−02 | −2.469279E−01 | −3.287085E−01 | −1.021710E−01 |
| A6 | 3.020201E−02 | 2.955546E−02 | 3.538420E−01 | 3.987325E−01 | 3.814934E−02 |
| A8 | −1.180549E−02 | 2.642715E−02 | −2.969362E−01 | −3.033254E−01 | 1.324256E−03 |
| A10 | 2.866936E−03 | −7.639896E−02 | 1.287777E−01 | 1.307088E−01 | −1.158606E−02 |
| A12 | 1.105435E−03 | 5.817589E−02 | −2.688228E−02 | −3.164461E−02 | 5.710189E−03 |
| A14 | −4.147172E−04 | −1.953787E−02 | 1.543597E−03 | 4.061342E−03 | −1.170815E−03 |
| A16 | 0.000000E+00 | 2.503901E−03 | 1.824327E−04 | −2.167431E−04 | 8.868237E−05 |

The imaging lens in Example 8 satisfies conditional expressions (1) to (13) as shown in Table 11.

Figure 16:
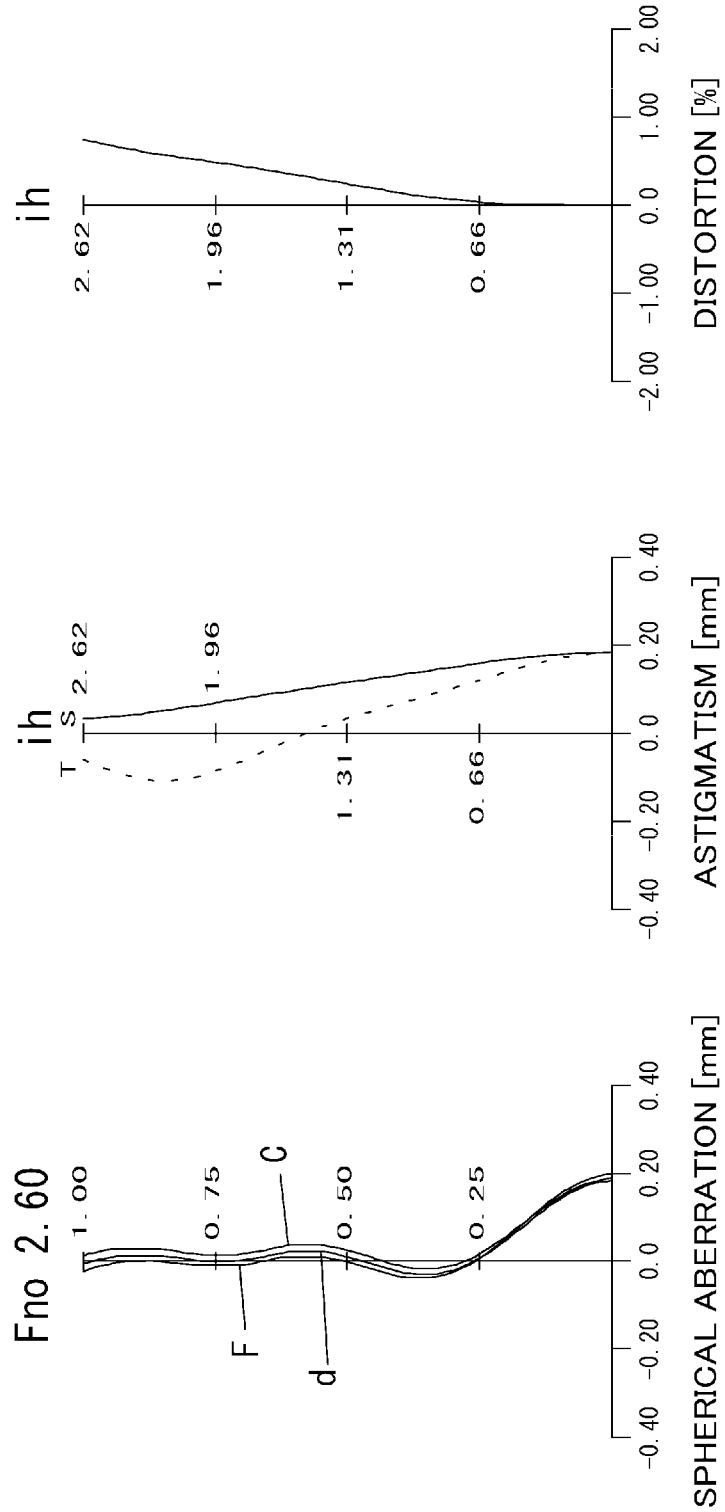
FIG. 16 shows spherical aberration, astigmatism, and distortion of the imaging lens in Example 8 according to the present invention.
Figure 17:
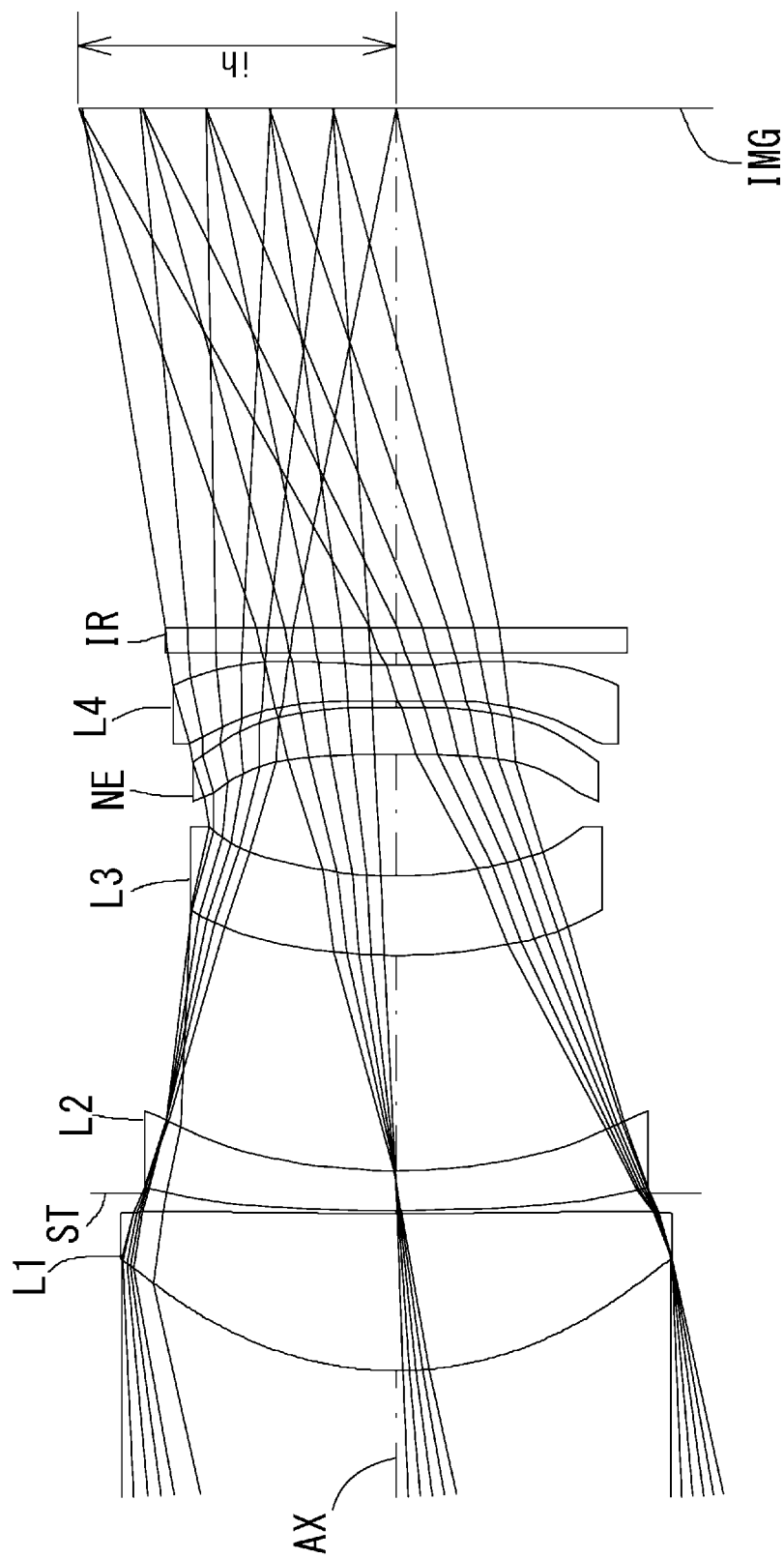
FIG. 17 is a schematic view showing the general configuration of an imaging lens in Example 9 according to the present invention.

FIG. 16 shows spherical aberration (mm), astigmatism (mm), and distortion (%) of the imaging lens in Example 8. As shown in FIG. 16, each aberration is corrected excellently.

Example 9

The basic lens data is shown below in Table 9.

TABLE 9

Example 9

Unit mm f = 12.00
Fno = 2.6
ω(°) = 12.4
ih = 2.62
TTL = 10.54

Surface Data

| Surface Number i | Curvature Radius r | Surface Distance d | Refractive Index Nd | Abbe Number vd |
|---|---|---|---|---|
| (Object) | Infinity | Infinity | | |
| 1 | Infinity | Infinity | | |
| 2* | 3.0100 | 1.3000 | 1.544 | 55.86 |
| 3* | 64.3847 | 0.1723 | | |
| 4 (Stop) | Infinity | −0.1493 | | |
| 5* | 16.4103 | 0.3317 | 1.661 | 20.37 |
| 6* | 5.2414 | 1.7822 | | |
| 7* | 4.6710 | 0.6570 | 1.535 | 55.66 |
| 8* | 3.4569 | 1.0017 | | |
| 9* | Infinity | 0.3921 | 1.661 | 20.37 |
| 10* | Infinity | 0.0506 | | |
| 11* | 7.1949 | 0.3000 | 1.535 | 55.66 |
| 12* | 5.0957 | 0.5000 | | |
| 13 | Infinity | 0.2100 | 1.517 | 64.20 |
| 14 | Infinity | 4.0633 | | |
| Image Plane | Infinity | | | |

Constituent Lens Data

| Lens | Start Surface | Focal Length | | Composite Focal Length |
|---|---|---|---|---|
| 1 | 2 | 5.758 | f12 | 9.390 |
| 2 | 5 | −11.795 | f23 | −7.831 |
| 3 | 7 | −30.648 | f34 | −16.079 |
| 4 | 11 | −34.369 | | |

Aspheric Surface Data

| | Second Surface | Third Surface | Fifth Surface | Sixth Surface | Seventh Surface |
|---|---|---|---|---|---|
| k | 0.000000E+00 | 0.000000E+00 | 0.000000E+00 | −6.060000E+00 | 0.000000E+00 |
| A4 | −1.645754E−03 | −2.397643E−03 | 1.949896E−03 | 6.667911E−03 | −3.730951E−03 |
| A6 | 3.334878E−04 | 1.194930E−03 | −3.402100E−03 | 1.097536E−03 | −1.337562E−02 |
| A8 | −1.123926E−04 | −1.706964E−04 | 2.536343E−03 | −2.536546E−03 | 2.071262E−02 |
| A10 | −9.534742E−06 | −1.841871E−05 | −5.561909E−04 | 2.488786E−03 | −1.035053E−02 |
| A12 | 0.000000E+00 | 1.696436E−06 | 3.828115E−05 | −8.861881E−04 | 2.655671E−03 |
| A14 | 0.000000E+00 | 1.833963E−07 | 0.000000E+00 | 1.314407E−04 | −3.043226E−04 |
| A16 | 0.000000E+00 | 0.000000E+00 | 0.000000E+00 | −7.143206E−06 | 3.764424E−06 |

| | Eighth Surface | Ninth Surface | Tenth Surface | Eleventh Surface | Twelfth Surface |
|---|---|---|---|---|---|
| k | 0.000000E+00 | 0.000000E+00 | 0.000000E+00 | 0.000000E+00 | −9.000000E+00 |
| A4 | −2.707631E−02 | −6.140554E−02 | −2.274131E−01 | −3.399072E−01 | −1.122620E−01 |
| A6 | 9.561404E−03 | 7.594958E−03 | 3.570964E−01 | 5.153713E−01 | 9.699879E−02 |
| A8 | −1.623249E−03 | −1.991526E−02 | −3.970538E−01 | −5.265244E−01 | −7.579951E−02 |
| A10 | 5.718394E−03 | 1.814284E−02 | 2.592511E−01 | 3.212605E−01 | 3.756514E−02 |
| A12 | −2.752446E−03 | −5.117449E−02 | −9.748865E−02 | −1.146055E−01 | −1.092058E−02 |
| A14 | 4.265143E−04 | −6.765266E−04 | 1.936763E−02 | 2.209945E−02 | 1.700749E−03 |
| A16 | 0.000000E+00 | 3.733183E−04 | −1.554972E−03 | −1.773570E−03 | −1.099030E−04 |

The imaging lens in Example 9 satisfies conditional expressions (1) to (13) as shown in Table 11.

Figure 18:
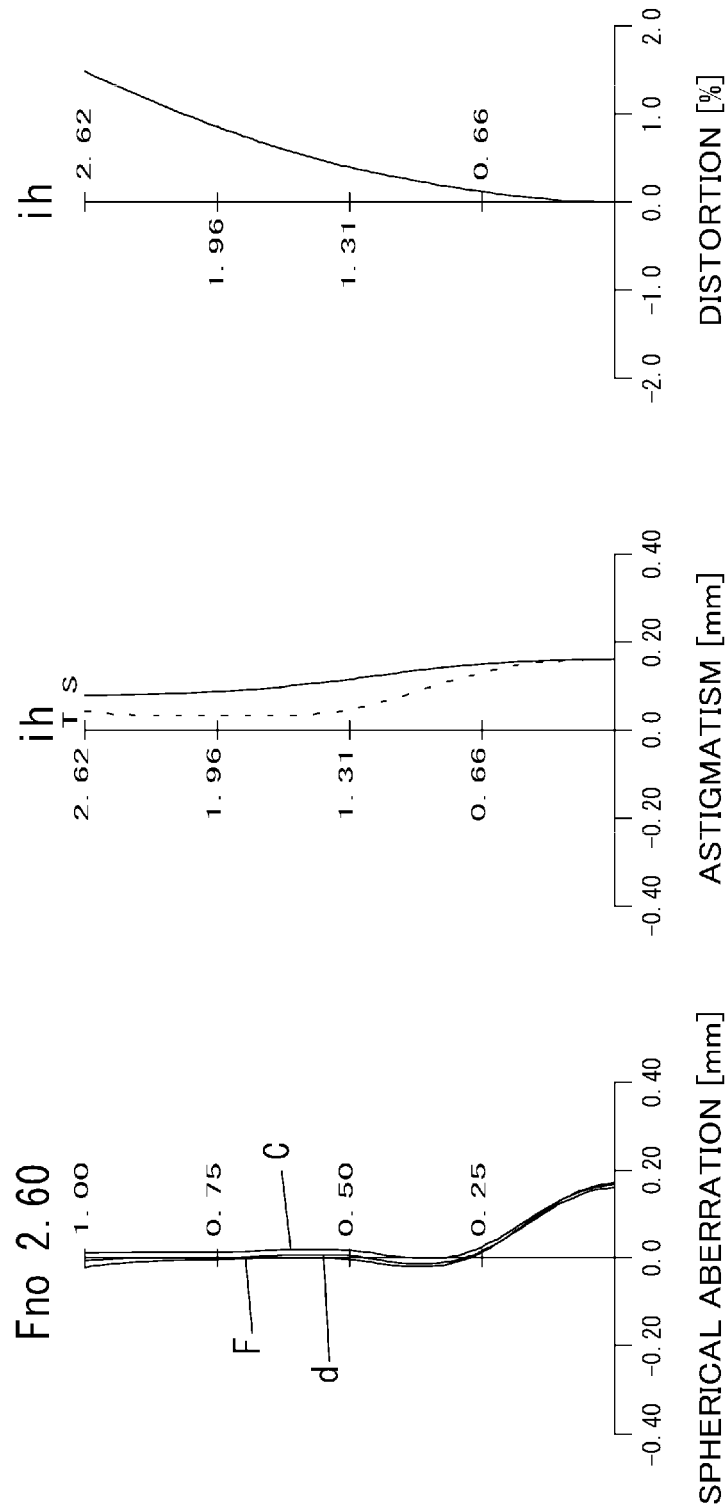
FIG. 18 shows spherical aberration, astigmatism, and distortion of the imaging lens in Example 9 according to the present invention.

FIG. 18 shows spherical aberration (mm), astigmatism (mm), and distortion (%) of the imaging lens in Example 9. As shown in FIG. 18, each aberration is corrected excellently.

Example 10

The basic lens data is shown below in Table 10.

TABLE 10

Example 10

Unit mm f = 12.00
Fno = 2.6
ω(°) = 12.5
ih = 2.62
TTL = 10.57

Surface Data

| Surface Number i | Curvature Radius r | Surface Distance d | Refractive Index Nd | Abbe Number vd |
|---|---|---|---|---|
| (Object) | Infinity | Infinity | | |
| 1 | Infinity | Infinity | | |
| 2 | Infinity | 5.0100 | 1.901 | 37.05 |
| 3 | Infinity | 0.9800 | | |
| 4* | 2.8946 | 1.3050 | 1.544 | 55.86 |
| 5* | 28.4522 | 0.1973 | | |
| 6 (Stop) | Infinity | −0.1634 | | |
| 7* | 15.3702 | 0.3321 | 1.661 | 20.37 |
| 8* | 4.9478 | 1.4770 | | |
| 9* | 4.0881 | 0.7572 | 1.535 | 55.66 |
| 10* | 3.0544 | 1.0120 | | |
| 11* | Infinity | 0.3660 | 1.661 | 20.37 |
| 12* | Infinity | 0.0641 | | |
| 13* | 8.0643 | 0.3000 | 1.535 | 55.66 |
| 14* | 4.9352 | 0.7880 | | |
| 15 | Infinity | 0.2100 | 1.517 | 64.20 |
| 16 | Infinity | 3.9956 | | |
| Image Plane | Infinity | | | |

Constituent Lens Data

| Lens | Start Surface | Focal Length | | Composite Focal Length |
|---|---|---|---|---|
| 1 | 4 | 5.816 | f12 | 9.817 |
| 2 | 7 | −11.185 | f23 | −7.463 |
| 3 | 9 | −30.329 | f34 | −19.387 |
| 4 | 13 | −54.621 | | |

Aspheric Surface Data

| | Fourth Surface | Fifth Surface | Seventh Surface | Eighth Surface | Ninth Surface |
|---|---|---|---|---|---|
| k | 0.000000E+00 | 0.000000E+00 | 0.000000E+00 | −0.000000E+00 | 0.000000E+00 |
| A4 | −1.771687E−03 | −2.193891E−03 | −5.317759E−03 | −1.550873E−03 | −8.469342E−03 |
| A6 | 3.195294E−04 | 1.246537E−03 | 2.939068E−03 | 6.027491E−03 | −1.649764E−02 |
| A8 | −1.090329E−04 | −1.543791E−04 | 2.105347E−03 | −1.346818E−03 | 3.186224E−02 |
| A10 | −9.725341E−06 | −1.833102E−05 | −1.265847E−04 | 2.345925E−04 | −2.148406E−02 |
| A12 | 0.000000E+00 | 1.285392E−06 | 6.159471E−06 | 8.236647E−05 | 7.791396E−03 |
| A14 | 0.000000E+00 | 1.794405E−07 | 0.000000E+00 | −5.221581E−05 | −1.431143E−03 |
| A16 | 0.000000E+00 | 0.000000E+00 | 0.000000E+00 | 5.969176E−06 | 9.824146E−06 |

| | Tenth Surface | Eleventh Surface | Twelfth Surface | Thirteenth Surface | Fourteenth Surface |
|---|---|---|---|---|---|
| k | 0.000000E+00 | 0.000000E+00 | 0.000000E+00 | 0.000000E+00 | −9.000000E+00 |
| A4 | −4.040501E−02 | −8.016024E−02 | −2.469279E−01 | −3.287085E−01 | −1.021710E−01 |
| A6 | 3.020201E−02 | 2.955546E−02 | 3.538420E−01 | 3.987325E−01 | 3.814934E−02 |
| A8 | −1.180549E−02 | 2.642715E−02 | −2.969362E−01 | −3.033254E−01 | 1.324256E−03 |
| A10 | 2.866936E−03 | −7.639896E−02 | 1.287777E−01 | 1.307088E−01 | −1.158806E−02 |
| A12 | 1.105435E−03 | 5.817589E−02 | −2.688228E−02 | −3.164461E−02 | 5.710189E−03 |
| A14 | −4.147172E−04 | −1.953787E−02 | 1.543597E−03 | 4.061342E−03 | −1.170815E−03 |
| A16 | 0.000000E+00 | 2.503901E−03 | 1.824327E−04 | −2.167431E−04 | 8.868237E−05 |

The imaging lens in Example 10 satisfies conditional expressions (1) to (13) as shown in Table 11.

FIG. 20 shows spherical aberration (mm), astigmatism (mm), and distortion (%) of the imaging lens in Example 10. As shown in FIG. 20, each aberration is corrected excellently.

In table 11, values of conditional expressions (1) to (13) related to the Examples 1 to 10 are shown.

TABLE 11

| Conditional Expression | Example 1 | Example 2 | Example 3 | Example 4 | Example 5 | Example 6 | Example 7 | Example 8 | Example 9 | Example 10 |
|---|---|---|---|---|---|---|---|---|---|---|
| (1) TTL/f | 0.95 | 0.95 | 0.95 | 0.90 | 0.85 | 0.84 | 0.83 | 0.88 | 0.88 | 0.88 |
| (2) (d3/TTL) * 100 | 9.38 | 9.45 | 9.70 | 3.37 | 2.95 | 2.98 | 3.01 | 7.16 | 6.23 | 7.16 |
| (3) (d4/TTL) * 100 | 5.41 | 5.06 | 5.38 | 3.67 | 2.95 | 2.98 | 3.01 | 2.84 | 2.85 | 2.84 |
| (4) TN/f | 0.19 | 0.23 | 0.19 | 0.15 | 0.12 | 0.10 | 0.10 | 0.12 | 0.12 | 0.12 |
| (5) (TNT/TTL) * 100 | 5.03 | 8.27 | 5.07 | 4.81 | 4.32 | 4.09 | 4.20 | 3.49 | 3.72 | 3.49 |
| (6) (d2/TTL) * 100 | 3.56 | 3.56 | 3.55 | 4.93 | 3.24 | 2.98 | 3.01 | 3.14 | 3.15 | 3.14 |
| (7) f1/f | 0.79 | 0.68 | 0.77 | 0.47 | 0.42 | 0.44 | 0.43 | 0.48 | 0.48 | 0.48 |
| (8) r1/r2 | 0.41 | 0.34 | 0.39 | −0.001 | 0.01 | 0.12 | 0.12 | 0.10 | 0.05 | 0.10 |
| (9) f2/f | −1.11 | −1.16 | −1.11 | −0.95 | −0.87 | −1.19 | −1.17 | −0.93 | −0.98 | −0.93 |
| (10) r3/r4 | 2.61 | 3.75 | 2.69 | 3.82 | 3.54 | 2.19 | 2.24 | 3.11 | 3.13 | 3.11 |
| (11) |f3|/f | 1.27 | 1.53 | 1.37 | 1.07 | 1.43 | 0.72 | 0.73 | 2.53 | 2.55 | 2.53 |
| (12) f23/f | −7.35 | −5.24 | −5.19 | −0.46 | −0.50 | −0.42 | −0.42 | −0.62 | −0.65 | −0.62 |
| (13) r7/r8 | 1.46 | 1.58 | 1.45 | 0.91 | 1.55 | 0.82 | 0.96 | 1.23 | 1.41 | 1.23 |

When the imaging lens composed of five optical elements according to the present invention is adopted to an imaging device mounted in an smartphone and mobile phone in which increasingly becomes large in pixels, an information terminal such as a game console, PC and a robot, moreover, a home appliance and an automobile with the camera function, there is realized contribution to reducing telephoto ratio of the camera and also high performance thereof.

What is claimed is:

1. An imaging lens comprising five optical elements, which comprise first through fourth lenses in order from an object side to an image side as follows:

a first lens as a first optical element having positive refractive power;

a second lens as a second optical element having negative refractive power and a convex surface facing the object side near an optical axis;

a third lens as a third optical element having the refractive power; and a fourth lens as a fourth optical element having refractive power and the convex surface facing the object surface near the optical axis, and further comprise an aberration correction optical element as a fifth optical element arranged between said third lens and said fourth lens, said aberration correction optical element having both flat surfaces near the optical axis and aspheric surfaces, wherein a below conditional expression (3) is satisfied:

$$2.00<(d4/TTL)\times100<7.10 \qquad (3)$$

where

TTL: distance along an optical axis from an object-side surface of the first lens to an image plane, and d4: thickness on the optical axis of the fourth lens.

2. The imaging lens comprising five optical elements according to claim 1, wherein a below conditional expression (1) is satisfied:

$$0.55<TTL/f<1.00 \qquad (1)$$

where f: focal length of the overall optical system of an imaging lens, and

TTL: distance along an optical axis from an object-side surface of the first lens to an image plane.

3. The imaging lens comprising five optical elements according to claim 1, wherein a below conditional expression (2) is satisfied:

$$2.00<(d3/TTL)\times100<12.65 \qquad (2)$$

where

TTL: distance along an optical axis from an object-side surface of the first lens to an image plane, and d3: thickness on the optical axis of the third lens.

4. The imaging lens comprising five optical elements according to claim 1, wherein a below conditional expression (4) is satisfied:

$$0.07<TN/f<0.30 \qquad (4)$$

where f: focal length of the overall optical system of an imaging lens, and

TN: distance along an optical axis of an air space for arranging the aberration correction optical element.

5. The imaging lens comprising five optical elements according to claim 1, wherein a below conditional expression (5) is satisfied:

$$2.4<(TNT/TTL)\times100<10.8 \qquad (5)$$

where

TTL: distance along an optical axis from an object-side surface of the first lens to an image plane, and TNT: thickness on the optical axis of the aberration correction optical element.

6. The imaging lens comprising five optical elements according to claim 1, wherein a below conditional expression (6) is satisfied:

$$2.00<(d2/TTL)\times100<6.5 \qquad (6)$$

where

TTL: distance along an optical axis from an object-side surface of the first lens to an image plane, and d2: thickness on the optical axis of the second lens.

7. The imaging lens comprising five optical elements according to claim 1, wherein a below conditional expression (7) is satisfied:

$$0.30<f1/1<1.1 \qquad (7)$$

where f: focal length of the overall optical system of an imaging lens, and f1: focal length of the first lens.

8. The imaging lens comprising five optical elements according to claim 1, wherein a below conditional expression (8) is satisfied:

$$-0.01 < r1/r2 < 0.6 \tag{8}$$

where r1: curvature radius of the object-side surface of the first lens, and r2: curvature radius of the image-side surface of the first lens.

9. The imaging lens comprising five optical elements according to claim 1, wherein a below conditional expression (9) is satisfied:

$$-1.6 < f2/f < -0.6 \tag{9}$$

where f: focal length of the overall optical system of an imaging lens, and f2: focal length of the second lens.

10. The imaging lens comprising five optical elements according to claim 1, wherein a below conditional expression (10) is satisfied:

$$1.5 < r3/r4 < 5.0 \tag{10}$$

where r3: curvature radius of the object-side surface of the second lens, and r4: curvature radius of the image-side surface of the second lens.

11. The imaging lens comprising five optical elements according to claim 1, wherein a below conditional expression (11) is satisfied:

$$0.5 < |f3|/f < 3.4 \tag{11}$$

where f: focal length of the overall optical system of an imaging lens, and f3: focal length of the third lens.

12. The imaging lens comprising five optical elements according to claim 1, wherein a below conditional expression (12) is satisfied:

$$-9.6 < f23/f < -0.25 \tag{12}$$

where f: focal length of the overall optical system of an imaging lens, and f23: composite focal length of the second lens and the third lens.

13. The imaging lens comprising five optical elements according to claim 1, wherein the fourth lens has a meniscus shape near the optical axis.

14. The imaging lens comprising five optical elements according to claim 1, wherein a below conditional expression (13) is satisfied:

$$0.5 < r7/r8 < 2.10 \tag{13}$$

where r7: curvature radius of the object-side surface of the fourth lens, and r8: curvature radius of the image-side surface of the fourth lens.

15. The imaging lens comprising five optical elements according to claim 1, wherein there is provided a folded optics which has a refractive surface at a place nearer to an object than said first lens, and enters light on said first lens by folding a direction of the light traveling of an object on said refractive surface at an approximately right angle.

* * * * *